United States Patent
Hao et al.

(10) Patent No.: US 12,101,269 B2
(45) Date of Patent: Sep. 24, 2024

(54) REMOTE INTERFERENCE MANAGEMENT METHOD AND APPARATUS

(71) Applicant: HUAWEI TECHNOLOGIES CO., LTD., Guangdong (CN)

(72) Inventors: Jinping Hao, Shanghai (CN); Yinghao Jin, Boulogne-Billancourt (FR); Shuigen Yang, Shanghai (CN); Hongzhuo Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 441 days.

(21) Appl. No.: 17/473,849

(22) Filed: Sep. 13, 2021

(65) Prior Publication Data

US 2021/0409177 A1    Dec. 30, 2021

Related U.S. Application Data

(63) Continuation of application No. PCT/CN2020/078326, filed on Mar. 7, 2020.

(30) Foreign Application Priority Data

Mar. 12, 2019 (CN) .......................... 201910186220.0
Apr. 30, 2019 (CN) .......................... 201910364101.X

(51) Int. Cl.
  *H04L 5/00* (2006.01)
  *H04W 72/541* (2023.01)
(52) U.S. Cl.
  CPC ......... *H04L 5/0048* (2013.01); *H04W 72/541* (2023.01)
(58) Field of Classification Search
  CPC .................. H04L 5/0048; H04L 5/0091; H04L 5/0073; H04W 72/541; H04W 72/27;
  (Continued)

(56) References Cited

U.S. PATENT DOCUMENTS

| | | |
|---|---|---|
| 2013/0163569 A1 | 6/2013 | Lee et al. |
| 2018/0300210 A1 | 10/2018 | Feng et al. |
| 2021/0250735 A1 | 8/2021 | Hao et al. |

FOREIGN PATENT DOCUMENTS

| | | |
|---|---|---|
| CN | 103563477 A | 2/2014 |
| CN | 104753838 A | 7/2015 |

(Continued)

OTHER PUBLICATIONS

Huawei, Discussion on signalling design for RIM. 3GPP TSG-RAN3 Meeting #104, Reno, Nevada, US, May 13-17, 2019, R3-192679, 3 pages.

(Continued)

*Primary Examiner* — Christopher M Brandt
(74) *Attorney, Agent, or Firm* — HUAWEI TECHNOLOGIES CO., LTD.

(57) ABSTRACT

A remote interference management method and an apparatus are provided. The method includes: A first network device receives a reference signal (RS) sent by a second network device, where the RS is used to indicate that the second network device is subject to remote interference. The first network device determines first auxiliary information, and sends the first auxiliary information to the second network device. The first auxiliary information includes at least one of the following information: frequency domain information of a downlink transmission resource of the first network device, time domain information of the downlink transmission resource of the first network device, or beam information of downlink transmission of the first network device.

20 Claims, 8 Drawing Sheets

(58) Field of Classification Search
CPC ............. H04W 52/143; H04W 52/243; H04W 72/29; H04W 88/085; H04B 17/345
See application file for complete search history.

(56) References Cited

FOREIGN PATENT DOCUMENTS

| | | |
|---|---|---|
| CN | 105557010 A | 5/2016 |
| CN | 108738042 A | 11/2018 |
| CN | 109075932 A | 12/2018 |
| CN | 110536285 A | 12/2019 |
| WO | 2018030529 A1 | 2/2018 |
| WO | 2020034328 A1 | 2/2020 |
| WO | 2020034570 A1 | 2/2020 |
| WO | 2020088616 A1 | 5/2020 |

OTHER PUBLICATIONS

Huawei, gNB grouping and set ID assignment. 3GPP TSG-RAN3 Meeting #102, Spokane, US, Nov. 12-16, 2018, R3-186493, 2 pages.
Fr d ric Olivier et al., Distributed Control of Photovoltaic Units in Unbalanced LV Distribution Networks to Prevent Overvoltages. 2018 IEEE International Conference on Smart Energy Grid Engineering (SEGE), Oct. 22, 2018, 9 pages.
CMCC, Summary of offline discussion on inter-cluster signalling for RIM. 3GPP TSG-RAN WG3 #102, Spokane, USA, Nov. 12-16, 2018, R3-187206, 3 pages.
Chairman, Draft Agenda. 3GPP TSG RAN WG1 Meeting #95, Spokane, USA, Nov. 12-16, 2018 , R1-1812100, 8 pages.
ZTE, TP on Inter-gNB Coordination for RIM With Core Network Involvement. 3GPP TSG-RAN WG3 #102, Spokane, WA, USA, Nov. 12-16, 2018, R3-186498, 6 pages.
Sun Shao-hui et al., Overview on the Progress of Design and Standardization of the Fifth Generation of Mobile Communications System. Journal of Beijing University of Posts and Telecommunications , vol. 41 No. 5, Oct. 2018, 18 pages.
3GPP TS 38.300 V15.4.0 (Dec. 2018), 3rd Generation Partnership Project; Technical Specification Group Radio Access Network; NR; NR and NG-RAN Overall Description; Stage 2(Release 15), 97 pages.
CMCC, New Study Item proposal: Remote Interference Management in NR. 3GPP TSG RAN Meeting #78, Lisbon, Portugal, Dec. 18-21, 2017, RP-172384, 4 pages.
CMCC, Signalling flow with CN involvement for backhaul-based RIM frameworks . 3GPP TSG-RAN WG3 #102, Spokane, USA, Nov. 12-16, 2018, R3-186623, 9 pages.
3GPP TS 38.401 V15.4.0 (Dec. 2018), 3rd Generation Partnership Project; Technical Specification Group Radio Access Network; NG-RAN; Architecture description(Release 15), 40 pages.
3GPP TS 38.410 V15.2.0 (Dec. 2018), 3rd Generation Partnership Project; Technical Specification GroupRadio Access Network; NG-RAN; NG general aspects and principles(Release 15), 15 pages.
3GPP TS 38.413 V15.2.0 (Dec. 2018), 3rd Generation Partnership Project; Technical Specification Group Radio Access Network; NG-RAN; NG Application Protocol (NGAP)(Release 15), 308 pages.
3GPP TS 38.473 V15.4.1 (Jan. 2019), 3rd Generation Partnership Project; Technical Specification Group Radio Access Network; NG-RAN; F1 application protocol (F1AP)(Release 15), 192 pages.
Session Chairman, Agenda. 3GPP TSG-RAN WG3 #102, Spokane, WA, USA, Nov. 12-16, 2018, R3-187199, 9 pages.
Qualcomm Incorporated, Coordinated RS Transmission. 3GPP TSG-RAN WG3 #101bis, Chengdu, China Oct. 8-12, 2018, R3-185515, 3 pages.
Ericsson, On OAM functions to support RIM operation. 3GPP TSG-RAN WG1 Meeting Ad-Hoc Meeting 1901, Taipei, Taiwan, Jan. 21-25, 2019, R1-1900761, 5 pages.
Cewit: "On remote interference management reference signal design", 3GPP Draft; R1-1813375_0N Remote Reference Signal Design, vol. RAN WG1, No. Spokane, USA; Nov. 2, 2018 (Nov. 2, 2018), XP051479690 ,total 5 pages.

REMOTE INTERFERENCE MANAGEMENT METHOD AND APPARATUS

CROSS-REFERENCE TO RELATED APPLICATIONS

This application is a continuation of International Application No. PCT/CN2020/078326, filed on Mar. 7, 2020, which claims priority to Chinese Patent Application No. 201910364101.X, filed on Apr. 30, 2019 and Chinese Patent Application No. 201910186220.0, filed on Mar. 12, 2019. All of the aforementioned patent applications are hereby incorporated by reference in their entireties.

TECHNICAL FIELD

This application relates to the field of communications technologies, and in particular, to a remote interference management method and an apparatus.

BACKGROUND

In special atmospheric conditions, propagation paths of electromagnetic waves propagated in the atmosphere bend to the ground due to atmospheric refraction. When a curvature of the propagation paths exceeds the surface curvature of the earth, some electromagnetic waves are trapped in a thin atmospheric layer with a specific thickness. This is similar to electromagnetic wave propagation in a waveguide. This phenomenon is referred to as an atmospheric duct phenomenon. Due to the atmospheric duct phenomenon, a downlink signal sent by a base station in an area A may be propagated to an area B. A distance between the area B and the area A may reach 300 km. If a base station in the area B is scheduling uplink transmission, the downlink signal propagated from the area A to the area B causes interference to the uplink transmission scheduled by the base station in the area B. Usually, such interference is referred to as remote interference (RI). The area A is an aggressor (aggressor) area, and the area B is a victim area.

A common remote interference management (RIM) method is to implement remote interference mitigation schemes by a base station in a victim area. Specifically, if the base station in the victim area implements the remote interference mitigation schemes in frequency domain, the base station needs to first measure an interference status of an entire available frequency band, and then select an available frequency that is not subject to interference, to schedule uplink transmission. If implementing the remote interference mitigation schemes in time domain, the base station needs to continuously monitor whether there is remote interference, and then schedules uplink transmission on a symbol that is not subject to interference. It can be learned that the base station in the victim area needs to first perform monitoring and then perform sending. However, this increases resource consumption of the base station in the victim area, wastes base station resources, and causes cell performance deterioration.

SUMMARY

This application provides a remote interference management method and an apparatus, to resolve a problem that cell performance deteriorates when remote interference management is implemented.

According to a first aspect, a remote interference management method in an embodiment of this application includes: A first network device receives a reference signal RS sent by a second network device, where the RS is used to indicate that the second network device is subject to remote interference. The first network device determines first auxiliary information, and sends the first auxiliary information to the second network device. The first auxiliary information includes at least one of the following information: frequency domain information of a downlink transmission resource of the first network device, time domain information of the downlink transmission resource of the first network device, or beam information of downlink transmission of the first network device. In this embodiment of this application, a network device (namely, the first network device) in an aggressor area sends the first auxiliary information to a network device (namely, the second network device) in a victim area, so that the network device in the victim area can select an available frequency, symbol, beam direction, or the like outside the transmission resource indicated by the first auxiliary information, to reduce impact of the remote interference on uplink transmission. According to the method, the network device in the victim area does not need to continuously monitor the interference, and can directly mitigate the remote interference. This can reduce resources consumed by the network device in the victim area for monitoring, and ensure cell performance of the victim area.

In a possible design, the frequency domain information of the downlink transmission resource of the first network device may include at least one downlink SSB frequency. Alternatively, the frequency domain information of the downlink transmission resource of the first network device may include at least one downlink SSB frequency and at least one downlink transmission bandwidth configuration. According to the foregoing design, the second network device may determine, based on the downlink SSB frequency and the downlink transmission bandwidth configuration of the first network device, a frequency range in which the first network device generates the remote interference. Therefore, the second network device may schedule the uplink transmission outside the frequency range, to reduce the impact of the remote interference on the uplink transmission.

In a possible design, the time domain information of the downlink transmission resource of the first network device may include at least one slot format configuration. According to the foregoing design, after receiving the first auxiliary information, the second network device may determine, based on the slot format configuration of the first network device, a symbol occupied by the downlink transmission of the first network device. Therefore, the second network device can determine, based on the symbol occupied by the downlink transmission of the first network device, a symbol used by the second network device to schedule the uplink transmission, to reduce the impact of the remote interference on the uplink transmission.

In a possible design, the beam information of the downlink transmission of the first network device may include at least one downlink beam configuration. According to the foregoing design, after receiving the first auxiliary information, the second network device may determine an uplink beam at the second network device. For example, when determining that the second network device is subject to the remote interference, the second network device may determine a direction in which the second network device is subject to the remote interference. Therefore, after receiving the first auxiliary information, the second network device may determine a direction range of a signal from the first network device with reference to the direction in which the second network device is subject to the remote interference and the downlink beam configuration of the first network device, to determine the uplink beam at the second network device. Therefore, a process in which the second network device first performs monitoring in each direction and then determines the uplink beam can be avoided, and further, resource overheads of the second network device can be reduced.

In a possible design, that the first network device sends the first auxiliary information to the second network device may include: The first network device sends a first message to the second network device, where the first message is used to notify the second network device that the first network device receives the RS, and the first message carries the first auxiliary information. Different from the current technology in which the second network device continuously monitors the interference, in the foregoing design, the first network device may send the first auxiliary information to the second network device through the first message, so that the second network device can determine an interference status, and therefore, can directly mitigate the remote interference. In this way, the resources consumed by the second network device for monitoring can be reduced.

In a possible design, that the first network device sends the first auxiliary information to the second network device may include: The first network device may periodically send the first auxiliary information to the second network device. In the foregoing design, the first network device periodically sends the first auxiliary information to the second network device, so that real-time performance of the first auxiliary information can be improved. Therefore, the second network device can perform remote interference management based on the first auxiliary information with relatively high real-time performance, and further, accuracy of remote interference management can be improved.

In a possible design, that the first network device sends the first auxiliary information to the second network device may include: The first network device sends the first auxiliary information to the second network device when downlink configuration information of the first network device is updated, where the downlink configuration information includes at least one of the following information: a downlink SSB frequency configuration, a downlink transmission bandwidth configuration, a slot format configuration, or a downlink beam configuration. In the foregoing design, the first network device sends the first auxiliary information to the second network device when the downlink configuration information is updated, so that the second network device can update the first auxiliary information in time, and further, accuracy of remote interference management can be improved. In addition, the first network device sends the first auxiliary information when the downlink configuration information is updated, so that signaling overheads can be reduced, and network resources can be saved.

In a possible design, the first network device may further receive second auxiliary information sent by the second network device, where the second auxiliary information includes at least one of the following information: frequency domain information corresponding to an uplink transmission resource of the second network device, information about a frequency that is in the uplink transmission resource of the second network device and that is subject to the interference in frequency domain, a quantity of symbols that are in the uplink transmission resource of the second network device and that are subject to the interference in time domain, a slot format configuration of the second network device, or beam information of the uplink transmission scheduled by the second network device. In the foregoing design, the first network device may determine, based on the second auxiliary information sent by the second network device, a transmission resource that is of the second network device and that is subject to the remote interference. Therefore, a solution for the transmission resource that is subject to the remote interference may be adopted to reduce the remote interference.

In a possible design, the first network device may further stop performing downlink transmission on a first transmission resource or reduce power for performing downlink transmission on a first transmission resource, where the first transmission resource is a transmission resource corresponding to the second auxiliary information. In the foregoing design, after determining the transmission resource that is of the second network device and that is subject to the remote interference, the first network device may reduce or stop the downlink transmission on the transmission resource, to reduce the remote interference to the second network device.

In a possible design, if the second auxiliary information includes the frequency domain information corresponding to the uplink transmission resource of the second network device or the information about the frequency that is in the uplink transmission resource of the second network device and that is subject to the interference in frequency domain, a frequency domain range of the first transmission resource may be a frequency domain range indicated by the second auxiliary information. In the foregoing design, the first network device avoids a frequency domain resource used for the uplink transmission scheduled by the second network device, so that the remote interference to the second network device can be reduced.

In a possible design, if the second auxiliary information includes the quantity of symbols that are in the uplink transmission resource of the second network device and that are subject to the interference in time domain or the slot format configuration of the second network device, a symbol in the first transmission resource in time domain may be a symbol determined based on a symbol indicated by the second auxiliary information. In the foregoing design, the first network device adjusts, based on the quantity of symbols that are in the uplink transmission resource of the second network device and that are subject to the interference in time domain or the slot format configuration of the second network device, the symbol used for the downlink transmission, so that the remote interference to the second network device can be reduced.

In a possible design, if the second auxiliary information includes the beam information of the uplink transmission scheduled by the second network device, a beam corresponding to the first transmission resource is a beam determined based on the second auxiliary information. In the foregoing design, the first network device determines a downlink beam at the first network device based on an uplink beam configuration of the second network device, so that the remote interference to the second network device can be reduced.

In a possible design, the first network device may be a first distributed unit (DU).

In a possible design, the second network device is a second DU.

In a possible design, the first DU sends, through a first CU or a first CU-CP connected to the first DU, the first auxiliary information to a second CU or a second CU-CP connected to the second DU. It is contemplated that the first auxiliary information to either, or both, of the second CU or the second CU-CP.

In a possible design, the first DU receives, through the first CU or the first CU-CP connected to the first DU, the second auxiliary information sent by the second DU through the second CU or the second CU-CP connected to the second DU.

According to a second aspect, a remote interference management method in an embodiment of this application includes: A second network device receives a first message sent by a first network device, where the first message is used to notify the second network device that the first network device receives a reference signal RS, and the RS is used to indicate that the second network device is subject to remote interference. The second network device determines second auxiliary information, where the second auxiliary information includes at least one of the following information: frequency domain information corresponding to an uplink transmission resource of the second network device, information about a frequency that is in the uplink transmission resource of the second network device and that is subject to the interference in frequency domain, a quantity of symbols that are in the uplink transmission resource of the second network device and that are subject to the interference in time domain, a slot format configuration of the second network device, or beam information of uplink transmission scheduled by the second network device. The second network device sends the second auxiliary information to the first network device. In this embodiment of this application, a network device (namely, the second network device) in a victim area sends auxiliary information to a network device (namely, the first network device) in an aggressor area, so that the network device in the aggressor area can stop or reduce downlink transmission on a frequency on which the remote interference is generated, or in a symbol or a beam direction in which the remote interference is generated. In this way, the network device in the aggressor area can directly mitigate the remote interference. In addition, different from a method in which the network device in the victim area includes corresponding information in the RS signal, in this embodiment of this application, the second network device may send the auxiliary information over a wired link. The wired link may be a transmission link through an Xn interface or a transmission link through a core network. Therefore, integrity of the second auxiliary information can be ensured. In addition, compared with a static configuration, for example, configuring a longer uplink-downlink time interval of the aggressor area and a longer uplink-downlink time interval of the victim area, or configuring different frequencies for a downlink of the aggressor area and an uplink of the victim area, in this embodiment of this application, cell performance deterioration can be effectively reduced.

In a possible design, the frequency domain information corresponding to the uplink transmission resource of the second network device may include a synchronization signal block SSB frequency used for the scheduled uplink transmission. Alternatively, the frequency domain information corresponding to the uplink transmission resource of the second network device includes an SSB frequency and a transmission bandwidth configuration that are used for the scheduled uplink transmission. In the foregoing design, the second network device sends the second auxiliary information to the first network device, so that the first network device can determine a frequency domain range in which the second network device schedules the uplink transmission. Therefore, the first network device can adopt a remote interference mitigation scheme in the frequency domain range.

In a possible design, that the second network device sends the second auxiliary information to the first network device may include: The second network device periodically sends the second auxiliary information to the first network device. In the foregoing design, the second network device periodically sends the second auxiliary information to the first network device, so that real-time performance of the second auxiliary information can be improved. Therefore, the first network device can perform remote interference management based on the second auxiliary information with relatively high real-time performance, and further, accuracy of remote interference management can be improved.

In a possible design, that the second network device sends the second auxiliary information to the first network device may include: The second network device sends the second auxiliary information to the first network device when uplink configuration information of the second network device is updated, where the uplink configuration information includes at least one of the following information: an uplink SSB frequency configuration, an uplink transmission bandwidth configuration, a slot format configuration, or an uplink beam configuration. In the foregoing design, the second network device sends the second auxiliary information to the first network device when the uplink configuration information is updated, so that network device can update the second auxiliary information in time, and further, accuracy of remote interference management can be improved. In addition, the second network device sends the second auxiliary information when the uplink configuration information is updated, so that signaling overheads can be reduced, and network resources can be saved.

In a possible design, that the second network device sends the second auxiliary information to the first network device may include: The second network device sends the second auxiliary information to the first network device after receiving the first message. In the foregoing design, after receiving the first message, the second network device sends the second auxiliary information to the first network device over the wired link. Compared with a manner in which the second network device includes the second auxiliary information in the RS, this manner can ensure integrity of the second auxiliary information.

In a possible design, the second network device may further receive first auxiliary information sent by the first network device, where the first auxiliary information includes at least one of the following information: frequency domain information of a downlink transmission resource of the first network device, time domain information of the downlink transmission resource of the first network device, or beam information of downlink transmission of the first network device. In the foregoing design, the second network device may determine, based on the first auxiliary information, the transmission resource used by the first network device for the downlink transmission. Therefore, the second network device can schedule the uplink transmission outside the transmission resource, to reduce impact of the remote interference on the uplink transmission.

In a possible design, the frequency domain information of the downlink transmission resource of the first network device may include at least one downlink SSB frequency. Alternatively, the frequency domain information of the downlink transmission resource of the first network device may include at least one downlink SSB frequency and at least one downlink transmission bandwidth configuration.

According to the foregoing design, the second network device may determine, based on the downlink SSB frequency and the downlink transmission bandwidth configuration of the first network device, a frequency range in which the first network device generates the remote interference. Therefore, the second network device may schedule the uplink transmission outside the frequency range, to reduce the impact of the remote interference on the uplink transmission.

In a possible design, the time domain information corresponding to the downlink transmission resource of the first network device may include at least one slot format configuration. According to the foregoing design, after receiving the first auxiliary information, the second network device may determine, based on the slot format configuration of the first network device, a symbol occupied by the downlink transmission of the first network device. Therefore, the second network device can determine, based on the symbol occupied by the downlink transmission of the first network device, a symbol used by the second network device to schedule the uplink transmission, to reduce the impact of the remote interference on the uplink transmission.

In a possible design, the downlink beam information of the first network device may include at least one downlink beam configuration. According to the foregoing design, after receiving the first auxiliary information, the second network device may determine an uplink beam at the second network device. For example, the second network device may determine a direction range of a signal from the first network device based on location information of the first network device and the downlink beam configuration of the first network device, to determine the uplink beam at the second network device. Therefore, a process in which the second network device first performs monitoring in each direction and then determines the uplink beam can be avoided, and further, resource overheads of the second network device can be reduced.

In a possible design, the second network device may schedule the uplink transmission on a first transmission resource, where the first transmission resource is a transmission resource other than a second transmission resource, and the second transmission resource is a transmission resource corresponding to the first auxiliary information. In the foregoing design, after determining the downlink transmission resource used by the first network device, the second network device schedules the uplink transmission on a transmission resource other than the downlink transmission resource, so that the impact of the remote interference on the uplink transmission can be reduced.

In a possible design, if the first auxiliary information includes the frequency domain information of the downlink transmission resource of the first network device, a frequency of the first transmission resource may be any frequency outside the frequency domain range indicated by the first auxiliary information. In the foregoing design, after determining the frequency domain range used by the first network device for the downlink transmission, the second network device schedules the uplink transmission on another frequency outside the frequency domain range, so that the impact of the remote interference on the second network device can be reduced.

In a possible design, if the first auxiliary information includes the time domain information of the downlink transmission resource of the first network device, a symbol of the first transmission resource in time domain is a symbol determined based on the symbol indicated by the first auxiliary information. In the foregoing design, after determining the symbol occupied by the downlink transmission of the first network device, the second network device determines, based on the symbol occupied by the downlink transmission of the first network device, the symbol used by the second network device to schedule the uplink transmission. This can reduce the impact of the remote interference on the second network device.

In a possible design, if the first auxiliary information includes the beam information of the downlink transmission of the first network device, a beam corresponding to the first transmission resource is a beam determined based on the first auxiliary information. In the foregoing design, when determining that the second network device is subject to the remote interference, the second network device may determine a direction in which the second network device is subject to the remote interference. Therefore, after receiving the first auxiliary information, the second network device may determine the direction range of the signal from the first network device with reference to the direction in which the second network device is subject to the remote interference and the downlink beam information of the first network device, to determine the uplink beam at the second network device. Therefore, a process in which the second network device first performs monitoring in each direction and then determines the uplink beam can be avoided, and further, resource overheads of the second network device can be reduced.

In a possible design, the first network device may be a first DU.

In a possible design, the second network device is a second DU.

In a possible design, the second DU receives, through a second CU or a second CU-CP connected to the second DU, the first message sent by the first DU through a first CU or a first CU-CP connected to the first DU.

In a possible design, the second DU sends, through the second CU or the second CU-CP connected to the second DU, the second auxiliary information to the first CU or the first CU-CP connected to the first DU.

According to a third aspect, a remote interference management method in an embodiment of this application includes: A first distributed unit reports an interference intensity indication to an operation, administration and maintenance device, where the first distributed unit is any distributed unit in at least one distributed unit, so that the operation, administration and maintenance device groups the at least one distributed unit into at least one distributed unit set based on an interference intensity indication reported by the at least one distributed unit. The first distributed unit receives a distributed unit set identifier sent by the operation, administration and maintenance device, where the distributed unit set identifier is an identifier of a distributed unit set in which the first distributed unit is located. The distributed unit sends the distributed unit set identifier to a centralized unit. In this embodiment of this application, the distributed unit sends the distributed unit set identifier to the centralized unit, so that the CU can determine a grouping status of the connected DU. In the foregoing manner, a CU in a victim area may determine a grouping status of a connected DU, so that a radio access network device in an aggressor area and a radio access network device in the victim area may exchange information through the CU.

According to a fourth aspect, a remote interference management method in an embodiment of this application includes: An operation, administration and maintenance device groups at least one distributed unit into at least one distributed unit set based on an interference intensity indication reported by the at least one distributed unit. The operation, administration and maintenance device sends grouping information to a centralized unit, where the grouping information includes an identifier of the distributed unit set and an identifier of a distributed unit that is in the distributed unit set and that is connected to the centralized unit. In this embodiment of this application, the operation, administration and maintenance device sends the grouping information to the centralized unit, so that the CU can determine a grouping status of the connected DU. In the foregoing manner, a CU in a victim area may determine a grouping status of a connected DU, so that a radio access network device in an aggressor area and a radio access network device in the victim area may exchange information through the CU.

According to a fifth aspect, this application provides a remote interference management apparatus. The apparatus may be a network device, or may be a chip or a chip set in a network device. The apparatus may include a processing unit and a transceiver unit. When the apparatus is a network device, the processing unit may be a processor, and the transceiver unit may be a transceiver. The apparatus may further include a storage unit, and the storage unit may be a memory. The storage unit is configured to store instructions. The processing unit executes the instructions stored in the storage unit, to enable the network device to perform corresponding functions in the first aspect. Alternatively, the processing unit executes the instructions stored in the storage unit, to enable the network device to perform corresponding functions in the second aspect. When the apparatus is a chip or a chip set in a network device, the processing unit may be a processor, and the transceiver unit may be an input/output interface, a pin, a circuit, or the like. The processing unit executes instructions stored in a storage unit, to enable the network device to perform corresponding functions in the first aspect. Alternatively, the processing unit executes instructions stored in a storage unit, to enable the network device to perform corresponding functions in the second aspect. The storage unit may be a storage unit (for example, a register or a cache) in the chip or the chip set, or may be a storage unit (for example, a read-only memory or a random access memory) that is in the network device and that is located outside the chip or the chip set.

According to a sixth aspect, a remote interference management apparatus is provided. The apparatus includes a processor, a communications interface, and a memory. The communications interface is configured to transmit information, and/or a message, and/or data between the apparatus and another apparatus. The memory is configured to store computer-executable instructions. When the apparatus runs, the processor executes the computer-executable instructions stored in the memory, to enable the apparatus to perform the remote interference management method according to any one of the first aspect or the possible designs of the first aspect, or the remote interference management method according to any one of the second aspect or the possible designs of the second aspect.

According to a seventh aspect, this application further provides a computer-readable storage medium. The computer-readable storage medium stores instructions. When the instructions are run on a computer, the computer is enabled to perform the methods according to the foregoing aspects.

According to an eighth aspect, this application further provides a computer program product including instructions. When the instructions are run on a computer, the computer is enabled to perform the methods according to the foregoing aspects.

In addition, this application provides another remote interference management method and apparatus, to resolve a problem of communication addressing between a network device in an aggressor area and a network device in a victim area when remote interference management is implemented.

According to a ninth aspect, a remote interference management method in an embodiment of this application includes: A first distributed unit DU receives a reference signal RS sent by a second DU, where the RS is used to indicate that the second DU is subject to remote interference, the RS includes a second distributed unit set identifier of the second DU, and the second distributed unit set identifier is used to identify a distributed unit set to which the second DU belongs. The first DU sends a first message to a first centralized unit CU or a first centralized unit-control plane CU-CP connected to the first DU, where the first message includes the second distributed unit set identifier.

In this embodiment of this application, a DU in an aggressor area includes the second distributed unit set identifier in the first message, so that signaling overheads between the DU and a CU or a CU-CP connected to the DU are reduced.

In a possible design, the first message further includes at least one of the following information: a notification message that the first DU receives the RS sent by the second DU, a notification message that the first DU detects that the RS disappears, or first auxiliary information.

In a possible design, the first auxiliary information includes at least one of the following information: frequency domain information of a downlink transmission resource of the first DU, time domain information of the downlink transmission resource of the first DU, or beam information of downlink transmission of the first DU.

According to a tenth aspect, a remote interference management method in an embodiment of this application includes: A first network node receives a first message sent by a first distributed unit DU, where the first message includes a second distributed unit set identifier, the second distributed unit set identifier is carried in a reference signal RS that is sent by a second DU and that is received by the first DU, and the second distributed unit set identifier is used to identify a distributed unit set to which the second DU belongs. The first network node determines, based on the second distributed unit set identifier, a second centralized unit CU or a second centralized unit-control plane CU-CP connected to the second DU. The first network node determines a second message based on the first message. The first network node sends the second message to the second CU or the second CU-CP.

In this embodiment of this application, a CU or a CU-CP connected to a DU in an aggressor area determines, based on the second distributed unit set identifier, an identifier or an address of a CU or a CU-CP connected to a DU in a victim area, so that data can be accurately transmitted to a network device in the victim area.

In a possible design, the method includes: The second message includes the second distributed unit set identifier.

In a possible design, at least one of the first message or the second message further includes a first distributed unit set identifier, and the first distributed unit set identifier is used to identify a distributed unit set to which the first DU belongs.

In a possible design, at least one of the first message and the second message further includes at least one of the following information: a notification message that the first DU receives the RS sent by the second DU, a notification message that the first DU detects that the RS disappears, or first auxiliary information.

In a possible design, the first auxiliary information includes at least one of the following information: frequency domain information of a downlink transmission resource of the first DU, time domain information of the downlink transmission resource of the first DU, or beam information of downlink transmission of the first DU.

In a possible design, that the first network node determines, based on the second distributed unit set identifier, a second centralized unit CU or a second centralized unit-control plane CU-CP connected to the second DU includes: The first network node determines, based on the second distributed unit set identifier, an identifier or an address of the second CU or the second. CU-CP connected to the second DU.

In a possible design, the first network node is a first CU or a first CU-CP connected to the first DU.

According to an eleventh aspect, a remote interference management method in an embodiment of this application includes: A second distributed unit DU receives, through a second centralized unit CU or a second centralized unit-control plane CU-CP connected to the second DU, a second message sent by a first CU or a first CU-CP connected to a first DU, where the second message includes a first distributed unit set identifier of the first DU, and the first distributed unit set identifier is used to identify a distributed unit set to which the first DU belongs. The second DU sends a third message to the second CU or the second CU-CP connected to the second DU, where the third message includes the first distributed unit set identifier.

In this embodiment of this application, a DU in a victim area includes the first distributed unit set identifier in the third message, so that signaling overheads between the DU and a CU or a CU-CP connected to the DU are reduced.

In a possible design, the third message includes second auxiliary information, and the second auxiliary information includes at least one of the following information: frequency domain information corresponding to an uplink transmission resource of the second DU, information about a frequency that is in the uplink transmission resource of the second DU and that is subject to the interference in frequency domain, a quantity of symbols that are in the uplink transmission resource of the second DU and that are subject to the interference in time domain, a slot format configuration of the second DU, or beam information of uplink transmission scheduled by the second DU.

In a possible design, the second message includes at least one of the following information: a notification message that the first DU receives an RS sent by the second DU, a notification message that the first DU detects that the RS disappears, or first auxiliary information.

In a possible design, the first auxiliary information includes at least one of the following information: frequency domain information of a downlink transmission resource of the first DU, time domain information of the downlink transmission resource of the first DU, or beam information of downlink transmission of the first DU.

According to a twelfth aspect, a remote interference management method in an embodiment of this application includes: A second network node receives a third message sent by a second distributed unit DU, where the third message includes a first distributed unit set identifier, the first distributed unit set identifier is carried in a second message received by the second DU from a first DU, and the first distributed unit set identifier is used to identify a distributed unit set to which the first DU belongs. The second network node determines, based on the first distributed unit set identifier, a first centralized unit CU or a first centralized unit-control plane CU-CP connected to the first DU. The second network node determines a fourth message based on the third message. The second network node sends the fourth message to the first CU or the first CU-CP.

In this embodiment of this application, a CU or a CU-CP connected to a DU in a victim area determines, based on the first distributed unit set identifier, an identifier or an address of a CU or a CU-CP connected to a DU in an aggressor area, so that data can be accurately transmitted to a network device in the aggressor area.

In a possible design, the method includes: the fourth message includes the first distributed unit set identifier.

In a possible design, at least one of the third message or the fourth message includes second auxiliary information.

In a possible design, the second auxiliary information includes at least one of the following information: frequency domain information corresponding to an uplink transmission resource of the second DU, information about a frequency that is in the uplink transmission resource of the second DU and that is subject to the interference in frequency domain, a quantity of symbols that are in the uplink transmission resource of the second DU and that are subject to the interference in time domain, a slot format configuration of the second DU, or beam information of uplink transmission scheduled by the second DU.

In a possible design, the second message includes at least one of the following information: a notification message that the first DU receives an RS sent by the second DU, a notification message that the first DU detects that the RS disappears, or first auxiliary information.

In a possible design, the first auxiliary information includes at least one of the following information: frequency domain information of a downlink transmission resource of the first DU, time domain information of the downlink transmission resource of the first DU, or beam information of downlink transmission of the first DU.

In a possible design, that the second network node determines, based on the first distributed unit set identifier, a first centralized unit CU or a first centralized unit-control plane CU-CP connected to the first DU includes: The second network node determines, based on the first distributed unit set identifier, an identifier or an address of the first CU or the first CU-CP connected to the first DU.

In a possible design, the second network node is a second CU or a second CU-CP connected to the second DU.

According to a thirteenth aspect, this application provides a remote interference management apparatus. The apparatus may be a network device, or may be a chip or a chip set in a network device. The apparatus may include a processing unit and a transceiver unit. When the apparatus is a network device, the processing unit may be a processor, and the transceiver unit may be a transceiver. The apparatus may further include a storage unit, and the storage unit may be a memory. The storage unit is configured to store instructions. The processing unit executes the instructions stored in the storage unit, to enable the network device to perform a corresponding function in any one of the ninth aspect or the possible implementations of the ninth aspect; the processing unit executes the instructions stored in the storage unit, to enable the network device to perform a corresponding function in any one of the tenth aspect or the possible implementations of the tenth aspect; the processing unit executes the instructions stored in the storage unit, to enable the network device to perform corresponding functions in any one of the eleventh aspect or the possible implementations of the eleventh aspect; or the processing unit executes the instructions stored in the storage unit, to enable the network device to perform corresponding functions in any one of the twelfth aspect or the possible implementations of the twelfth aspect. When the apparatus is a chip or a chip set in a network device, the processing unit may be a processor, and the transceiver unit may be an input/output interface, a pin, a circuit, or the like. The processing unit executes instructions stored in a storage unit, to enable the network device to perform corresponding functions in any one of the ninth aspect or the possible implementations of the ninth aspect; the processing unit executes the instructions stored in the storage unit, to enable the network device to perform a corresponding function in any one of the tenth aspect or the possible implementations of the tenth aspect; the processing unit executes the instructions stored in the storage unit, to enable the network device to perform corresponding functions in any one of the eleventh aspect or the possible implementations of the eleventh aspect; or the processing unit executes the instructions stored in the storage unit, to enable the network device to perform corresponding functions in any one of the twelfth aspect or the possible implementations of the twelfth aspect. The storage unit may be a storage unit (for example, a register or a cache) in the chip or the chip set, or may be a storage unit (for example, a read-only memory or a random access memory) that is in the network device and that is located outside the chip or the chip set.

According to a fourteenth aspect, a remote interference management apparatus is provided. The apparatus includes a processor, a communications interface, and a memory. The communications interface is configured to transmit information, and/or a message, and/or data between the apparatus and another apparatus. The memory is configured to store computer-executable instructions. When the apparatus runs, the processor executes the computer-executable instructions stored in the memory, to enable the apparatus to perform the remote interference management method according to any one of the ninth aspect or the possible designs of the ninth aspect, the remote interference management method according to any one of the tenth aspect or the possible designs of the tenth aspect, the remote interference management method according to any one of the eleventh aspect or the possible designs of the eleventh aspect, or the remote interference management method according to any one of the twelfth aspect or the possible designs of the twelfth aspect.

According to a fifteenth aspect, this application further provides a computer-readable storage medium. The computer-readable storage medium stores instructions. When the instructions are run on a computer, the computer is enabled to perform the method according to any one of the ninth aspect or the possible implementations of the ninth aspect, the method according to any one of the tenth aspect or the possible implementations of the tenth aspect, the method according to any one of the eleventh aspect or the possible implementations of the eleventh aspect, or the method according to any one of the twelfth aspect or the possible implementations of the twelfth aspect.

According to a sixteenth aspect, this application further provides a computer program product including instructions. When the computer program product runs on a computer, the computer is enabled to perform the method according to any one of the ninth aspect or the possible implementations of the ninth aspect, the method according to any one of the tenth aspect or the possible implementations of the tenth aspect, the method according to any one of the eleventh aspect or the possible implementations of the eleventh aspect, or the method according to any one of the twelfth aspect or the possible implementations of the twelfth aspect.

DESCRIPTION OF EMBODIMENTS

To make the purpose, technical solutions, and advantages of embodiments of the present disclosure clearer, the following embodiments describe the technical solutions of the embodiments of the present disclosure with reference to the accompanying drawings in the embodiments of the present disclosure.

In special atmospheric conditions, propagation paths of electromagnetic waves propagated in the atmosphere bend to the ground due to atmospheric refraction. When a curvature of the propagation paths exceeds the surface curvature of the earth, some electromagnetic waves are trapped in a thin atmospheric layer with a specific thickness. This is similar to electromagnetic wave propagation in a waveguide. This phenomenon is referred to as an atmospheric duct phenomenon. Due to the atmospheric duct phenomenon, a downlink signal sent by a base station in an area A may be propagated to an area B. A distance between the area B and the area A may reach 300 km. If a base station in the area B is scheduling uplink transmission, the downlink signal propagated from the area A to the area B causes interference to the uplink transmission scheduled by the base station in the area B. Usually, such interference is referred to as remote interference (RI). The area A is an aggressor (aggressor) area, and the area B is a victim area.

Figure 1:
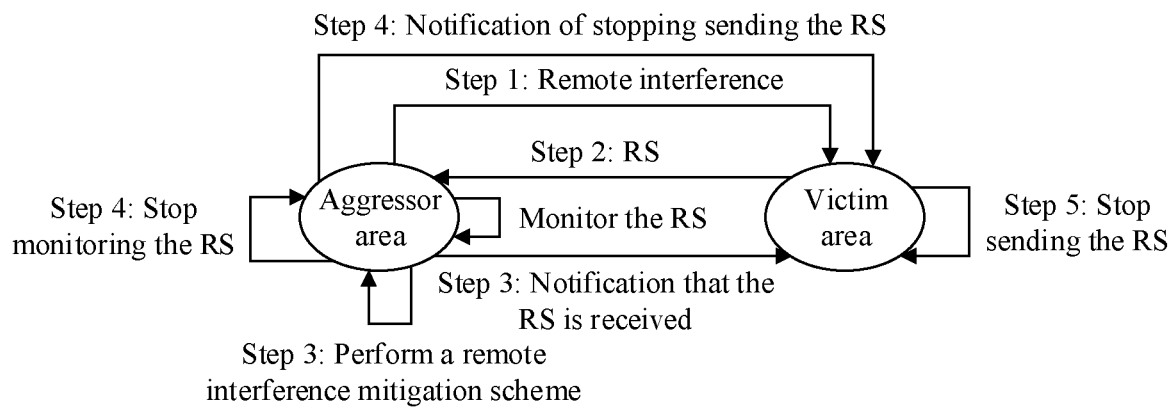
FIG. 1 is a schematic diagram of an RIM procedure according to an embodiment of this application.

Remote interference management (RIM) is a technical solution proposed to mitigate the remote interference. Currently, a remote interference management procedure is shown in FIG. 1, and specifically includes the following operations.

Operation 1: A downlink signal sent by a radio access network device in an aggressor area causes remote interference to receiving an uplink signal by a radio access network device in a victim area.

Operation 2: The radio access network device in the victim area sends a reference signal (RS) through an air interface, where the RS is used to indicate that radio access network device is subject to the remote interference.

Operation 3: The radio access network device in the aggressor area monitors and receives the RS, sends, to the radio access network device in the victim area over a wired link, a notification that the RS is received, and performs a remote interference mitigation scheme, where the wired link may be a transmission link through an Xn interface or a transmission link through a core network.

Operation 4: If the radio access network device in the aggressor area monitors but does not receive the RS, the radio access network device stops performing the remote interference mitigation scheme, stops RS monitoring, and sends, to the radio access network device in the victim area, a notification of stopping sending the RS.

Operation 5: The radio access network device in the victim area receives the notification of stopping sending the RS, and stops sending the RS.

Currently, the remote interference mitigation scheme may be implemented by the radio access network device in the aggressor area, or may be implemented by the radio access network device in the victim area, or may be implemented by both the radio access network device in the aggressor area and the radio access network device in the victim area.

When the radio access network device in the victim area implements the remote interference mitigation scheme, the remote interference mitigation scheme may be implemented in frequency domain. Specifically, the radio access network device needs to first measure an interference status of an entire available frequency band, and then select an available frequency that is not subject to interference, to schedule uplink transmission. When the radio access network device in the victim area implements the remote interference mitigation scheme, the remote interference mitigation scheme may be implemented in time domain. Specifically, the radio access network device needs to continuously monitor whether there is interference, and then schedules uplink transmission on a symbol that is not subject to interference. Therefore, when implementing the remote interference mitigation scheme, the radio access network device in the victim area needs to first monitor the interference status and then schedule the uplink transmission. This increases resource consumption, wastes base station resources, and causes cell performance deterioration.

When the radio access network device in the aggressor area implements the remote interference mitigation scheme, the radio access network device may learn of, by parsing the RS signal, a quantity of uplink symbols of the radio access network device in the victim area that are subject to the remote interference, and then avoid sending data on downlink symbols that occupy a same resource as these uplink symbols, or reconfigure a slot format. Alternatively, the radio access network device may parse the RS signal information to learn of information about an uplink frequency and uplink bandwidth of the radio access network device in the victim area, and then stop sending a downlink signal on a corresponding frequency resource. In this scheme, when sending the RS signal, the radio access network device in the victim area needs to include, in the RS signal, corresponding information such as information about the symbol that is subject to the remote interference and frequency domain information of an uplink transmission resource. However, a relatively small quantity of time-frequency resources are used to send the RS signal, and consequently, the RS signal can carry a relatively small amount of information. As a result, complete information cannot be carried. In addition, sending the corresponding information such as the information about the symbol that is subject to the remote interference and the frequency domain information of the uplink transmission resource through an air interface occupies time-frequency resources on the air interface. This affects cell performance.

Alternatively, a static configuration may be used for the aggressor area and the victim area to avoid the remote interference. For example, a longer uplink-downlink time interval of the aggressor area and a longer uplink-downlink time interval of the victim area are configured, or different frequencies are configured for a downlink of the aggressor area and an uplink of the victim area. However, the longer uplink-downlink time interval increases resource overheads, and consequently, cell performance deteriorates. In addition, different fixed uplink and downlink frequencies reduce spectral efficiency, and consequently, the cell performance also deteriorates.

Based on this, the embodiments of this application provide a remote interference management method and an apparatus, to resolve a problem in the current technology that the cell performance deteriorates in the remote interference management solution. The method and the apparatus are based on a same inventive concept. Because a problem-resolving principle of the method is similar to that of the apparatus, implementations of the apparatus and the method may mutually refer to each other, and no repeated description is provided.

Figure 2:
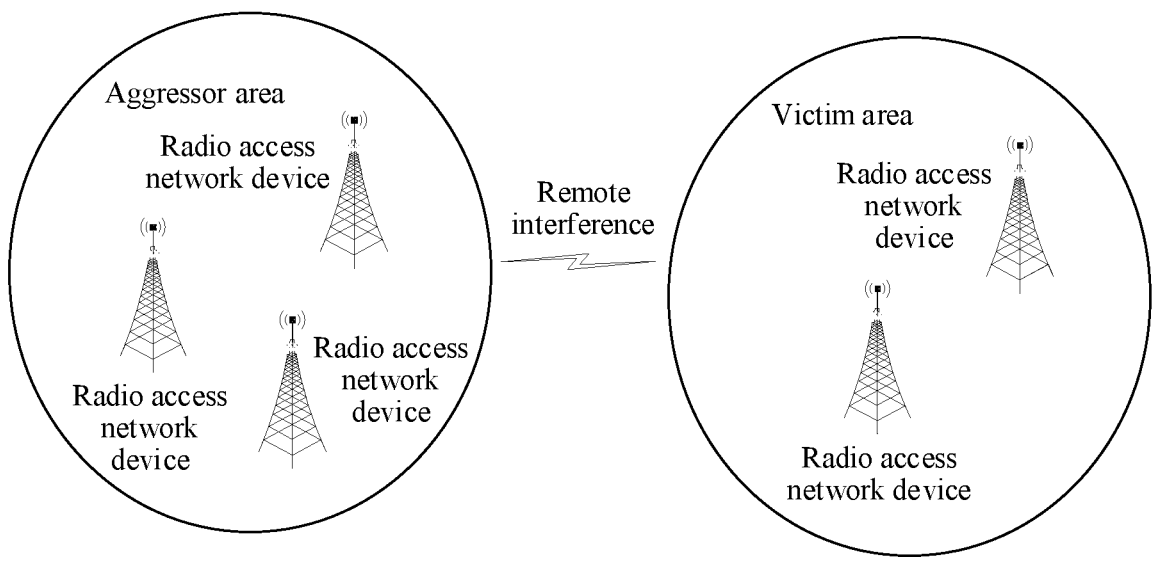
FIG. 2 is a schematic diagram of a remote interference scenario according to an embodiment of this application.

The embodiments of this application may be applied to, but not limited to, a next-generation wireless communications (new radio, "NR") system, may be applied to a communications system such as a time division duplex long term evolution (TDD-LTE) system, or may be extended to a cellular system related to wireless fidelity (Wi-Fi), worldwide interoperability for microwave access (WiMAX), a future wireless communications system, the 3rd generation partnership project (3GPP), or the like. For example, an architecture of a communications system of the embodiments of this application may be shown in FIG. 2, and includes an aggressor area and a victim area. The aggressor area includes at least one radio access network device, and the victim area includes at least one radio access network device. The radio access network device in the aggressor area may cause remote interference to the radio access network device in the victim area. It should be understood that FIG. 2 is merely an example for description, and quantities of radio access network devices included in the aggressor area and the victim area are not specifically limited. The communications system shown in FIG. 2 may further include other devices such as a core network device, a terminal, a relay device, and a backhaul device. This is not limited in the embodiments of this application either.

It should be understood that the radio access network device in the embodiments of this application is configured to connect a terminal to a wireless network. The radio access network device may be referred to as a base station, or may be referred to as a radio access network (RAN) node (or device). For example, the radio access network device may be a next-generation NodeB (gNB), a transmission reception point (TRP), an evolved NodeB (eNB), a radio network controller (RNC), a NodeB (NB), a base station controller (BSC), a base transceiver station (BTS), a home base station (for example, HNB), a baseband unit (BBU), or a wireless fidelity (Wi-Fi) access point (AP).

Figure 3A:
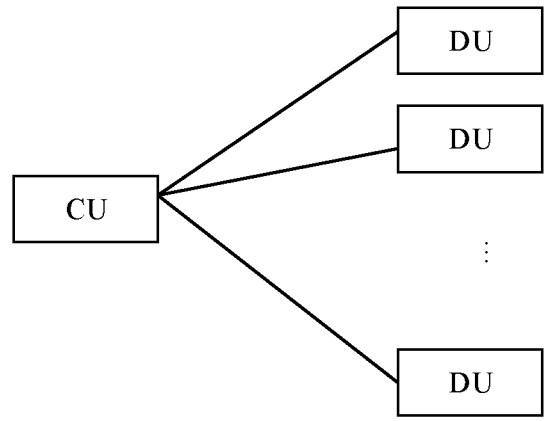
FIG. 3A is a schematic structural diagram of a radio access network device divided into a CU and DUs according to an embodiment of this application.

For example, a structure of the radio access network device in the embodiments of this application may be shown in FIG. 3A. Specifically, the radio access network device may be divided into a centralized unit (CU) and at least one distributed unit (DU). The CU may be configured to manage or control the at least one DU. In other words, the CU is connected to the at least one DU. In this structure, protocol layers of the radio access network device in the communications system may be separated. Some protocol layers are controlled by the CU in a centralized manner, functions of some or all of remaining protocol layers are distributed in DUs, and the CU controls the DUs in a centralized manner. For example, the radio access network device is a gNB. Protocol layers of the gNB include a radio resource control (RRC) layer, a service data adaptation protocol (SDAP) layer, a packet data convergence protocol (PDCP) layer, a radio link control (RLC) layer, a media access control (MAC) layer, and a physical layer. For example, the CU may be configured to implement functions of the RRC layer, the SDAP layer, and the PDCP layer, and the DU may be configured to implement functions of the RLC layer, the MAC layer, and the physical layer. Protocol stacks included in the CU and the DU are not specifically limited in the embodiments of this application.

For example, the CU in the embodiments of this application may be further divided into one control plane (CU-CP) network element and a plurality of user plane (CU-UP) network elements. The CU-CP may be configured for control plane management, and the CU-UP may be configured for user plane data transmission. An interface between the CU-CP and the CU-UP may be an E1 interface. An interface between the CU-CP and the DU may be F1-C, and is used for control plane signaling transmission. An interface between the CU-UP and the DU may be F1-U, and is used for user plane data transmission. The CU-UP and the CU-UP may be connected through an Xn-U interface, to perform user plane data transmission. For example, the gNB is used as an example, and a structure of the gNB may be shown in FIG. 3B.

It should be understood that, in the embodiments of this application, "at least one" means one or more, and "a plurality of" means two or more. The term "and/or" describes an association relationship between associated objects and represents three relationships may exist. For example, A and/or B may represent the following only A exists, both A and B exist, and only B exists (understanding that it is contemplated A and B may be singular or plural). The character "/" generally represents an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

The remote interference management method provided in this application is described below in detail with reference to the accompanying drawings.

Figure 4:
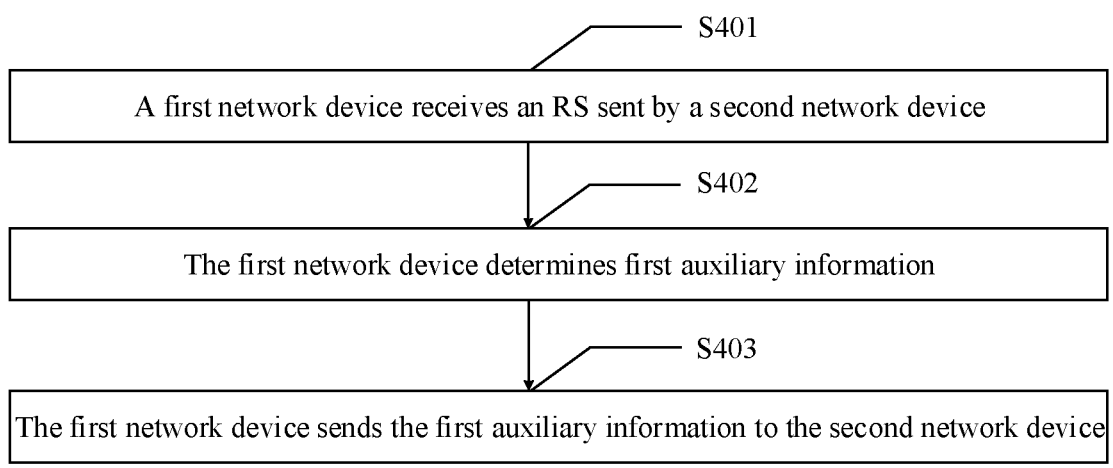
FIG. 4 is a schematic flowchart of a remote interference management method according to an embodiment of this application.

FIG. 4 is a flowchart of a remote interference management method according to this application. The method includes the following operations.

S401: A first network device receives an RS sent by a second network device. The RS is used to indicate that the second network device is subject to remote interference. The first network device may be any radio access network device in an aggressor area, and the second network device may be any radio access network device in a victim area.

In an example description, the RS may carry an identifier of the second network device. The first network device may search for an address of the second network device based on a pre-stored correspondence between an identifier and an address. Alternatively, the first network device obtains a correspondence between an identifier and an address from another network device, so that the first network device can learn of an address of the second network device.

In another example description, the RS may further carry an address of the second network device, so that the first network device can learn of the address of the second network device.

Certainly, the RS may further carry other information, which is not listed one by one herein.

During specific implementation, the second network device may send the RS to the first network device through an air interface. For details, refer to operation 2 in the RIM procedure shown in FIG. 1.

During specific implementation, the first network device and the second network device may have different function-separated architectures. For example, the first network device and the second network device each may be a gNB or an eNB. Alternatively, the first network device may be a DU, and the second network device may be a gNB or an eNB. Alternatively, the first network device may be a gNB or an eNB, and the second network device may be a DU. Alternatively, the first network device and the second network device each may be a DU.

S402: The first network device determines first auxiliary information, where the first auxiliary information includes at least one of the following information: frequency domain information of a downlink transmission resource of the first network device, time domain information of the downlink transmission resource of the first network device, or beam information of downlink transmission of the first network device.

The frequency domain information may indicate a frequency domain resource occupied by the downlink transmission of the first network device. For example, the frequency domain information may indicate a frequency range occupied by the downlink transmission of the first network device. The time domain information may indicate a time domain resource occupied by the downlink transmission of the first network device. For example, the time domain information may indicate slot format configurations of uplink and downlink transmission of the first network device, so that a sending time and a quantity of symbols of the uplink transmission scheduled by the first network device, a sending time and a quantity of symbols of the downlink transmission of the first network device, and the like may be determined based on the slot format configurations. The beam information may indicate a beam configuration used for the downlink transmission of the first network device. For example, the beam information may indicate a direction of a beam used for the downlink transmission of the first network device.

S403: The first network device sends the first auxiliary information to the second network device.

The first network device sends the first auxiliary information to the second network device based on the address that is of the second network device and that is obtained in operation S401.

A function-separated architecture of the first network device may be shown in FIG. 3A. When the first network device sends the first auxiliary information to the second network device, the first network device (namely, a first DU) may send the first auxiliary information to the second network device. Specifically, the first network device (namely, the first DU) may send the first auxiliary information to the second network device through a CU (which is referred to as a first. CU) connected to the first network device. In other words, the first network device (namely, the first DU) sends the first auxiliary information to the first CU, and then the first CU sends the first auxiliary information to the second network device. A function-separated architecture of the second network device may also be shown in FIG. 3A. Correspondingly, the second network device (namely, a second DU) may receive the first auxiliary information. Specifically, the second network device (namely, the second DU) may receive the first auxiliary information through a CU (which is referred to as a second CU) connected to the second network device. In other words, the second CU receives the first auxiliary information from the first network device, and then the second CU sends the first auxiliary information to the second network device (namely, the second DU).

Figure 3B:
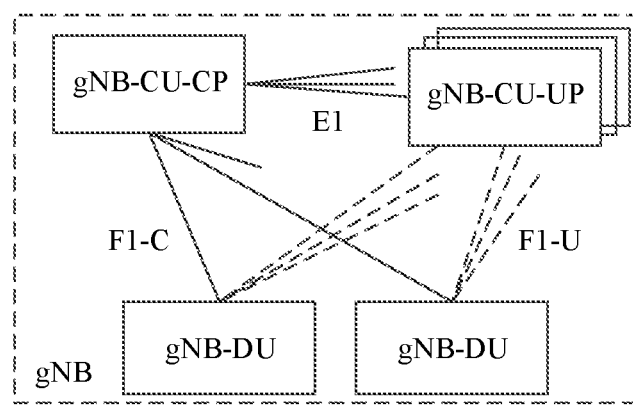
FIG. 3B is a schematic structural diagram of a radio access network device divided into a CU-CP, CU-UPs, and DUs according to an embodiment of this application.

The function-separated architecture of the first network device may alternatively be shown in FIG. 3B. When the first network device sends the first auxiliary information to the second network device, the first network device (namely, a first DU) may send the first auxiliary information to the second network device. Specifically, the first network device (namely, the first DU) may send the first auxiliary information to the second network device through a CU-CP (which is referred to as a first CU-CP) connected to the first network device. In other words, the first network device (namely, the first DU) sends the first auxiliary information to the first CU-CP, and then the first CU-CP sends the first auxiliary information to the second network device. The function-separated architecture of the second network device may also be shown in FIG. 3B. Correspondingly, the second network device (namely, a second DU) may receive the first auxiliary information. Specifically, the second network device (namely, the second DU) may receive the first auxiliary information through a CU-CP (which is referred to as a second CU-CP) connected to the second network device. In other words, the second CU-CP receives the first auxiliary information from the first network device, and then the second CU-CP sends the first auxiliary information to the second network device (namely, the second DU).

It should be understood that the function-separated architectures of the first network device and the second network device may be different. For example, the function-separated architecture of the first network device is shown in FIG. 3A, and the function-separated architecture of the second network device is shown in FIG. 3B. In this case, specifically, a first DU may send the first auxiliary information to a second CU-CP through a first CU, and then the second CU-CP sends the first auxiliary information to a second DU.

Alternatively, the function-separated architecture of the first network device is shown in FIG. 3B, and the function-separated architecture of the second network device is shown in FIG. 3A. In this case, specifically, a first DU may send the first auxiliary information to a second CU through a first CU-CP, and then the second CU sends the first auxiliary information to the second DU. Alternatively, one of the first network device or the second network device has a function-separated architecture. For example, the first network device is a first DU, and the second network device is a gNB or an eNB; or the first network device is a gNB or an eNB, and the second network device is a second DU.

In this embodiment of this application, the network device (namely, the first network device) in the aggressor area sends the first auxiliary information to the network device (namely, the second network device) in the victim area, so that the network device in the victim area can mitigate the remote interference based on a transmission resource indicated by the first auxiliary information, for example, select an appropriate frequency, symbol, or beam direction to schedule the uplink transmission. For example, the first auxiliary information includes the frequency range of the downlink transmission resource of the first network device. Therefore, when scheduling the uplink transmission, the second network device may select a frequency resource outside the frequency domain range corresponding to the downlink transmission resource of the first network device. In this embodiment of this application, the network device in the victim area does not need to continuously monitor the interference, and can directly mitigate the remote interference. This can avoid resources consumed by the network device in the victim area for monitoring, and ensure cell performance of the victim area. In addition, compared with a static configuration, for example, configuring a longer uplink-downlink time interval of the aggressor area and a longer uplink-downlink time interval of the victim area, or configuring different frequencies for a downlink of the aggressor area and an uplink of the victim area, in this embodiment of this application, cell performance deterioration can be effectively reduced.

For example, the frequency domain information of the downlink transmission resource of the first network device includes at least one downlink synchronization signal block (SSB) frequency. Alternatively, the frequency domain information of the downlink transmission resource of the first network device may include at least one SSB frequency and at least one downlink transmission bandwidth configuration.

The at least one downlink SSB frequency may include a current downlink SSB frequency of the first network device, and the at least one downlink bandwidth configuration includes a current downlink transmission bandwidth configuration of the first network device. In addition, the at least one downlink SSB frequency may further include a downlink SSB frequency that may be configured for the first network device in the future. The at least one bandwidth configuration may further include a downlink transmission bandwidth configuration that may be configured for the first network device in the future. Therefore, the second network device may determine, based on the downlink SSB frequency and the downlink transmission bandwidth configuration of the first network device, a frequency range in which the first network device generates the remote interference. Therefore, the second network device may schedule the uplink transmission outside the frequency range, to reduce impact of the remote interference on the uplink transmission.

The time domain information of the downlink transmission resource of the first network device may include at least one slot format configuration. The at least one slot format configuration may include a current slot format configuration of the downlink transmission resource of the first network device. In addition, the at least one slot format configuration may further include a slot format configuration that may be configured for the first network device in the future. Therefore, after receiving the first auxiliary information, the second network device may determine, based on the slot format configuration of the first network device, a symbol occupied by the downlink transmission of the first network device, and then the second network device may determine, based on the symbol occupied by the downlink transmission of the first network device, a symbol used by the second network device to schedule the uplink transmission. For example, the second network device determines, based on the slot format configuration of the first network device, that a symbol 1 to a symbol 5 are occupied by the downlink transmission of the first network device. It is assumed that there is no transmission delay. In this case, the second network device may schedule the uplink transmission starting from a symbol 6. For another example, the second network device determines, based on the slot format configuration of the first network device, that a symbol 1 to a symbol 5 are occupied by the downlink transmission of the first network device. It is assumed that a transmission delay is one symbol. The second network device may determine, based on the transmission delay and the symbols (namely, the symbol 1 to the symbol 5) occupied by the downlink transmission of the first network device, that symbols of the second network device that are subject to the remote interference are a symbol 2 to a symbol 6. In this case, the second network device may schedule the uplink transmission starting from a symbol 7, to reduce impact of the remote interference on the uplink transmission.

The beam information of the downlink transmission of the first network device includes at least one downlink beam configuration. The at least one downlink beam configuration may include a current downlink beam configuration of the first network device. In addition, the at least one downlink beam configuration may further include a downlink beam configuration that may be configured for the first network device in the future. Therefore, after receiving the first auxiliary information, the second network device may determine an uplink beam at the second network device. For example, when determining that the second network device is subject to the remote interference, the second network device may determine a direction in which the second network device is subject to the remote interference. Therefore, after receiving the first auxiliary information, the second network device may determine a direction range of a signal from the first network device with reference to the direction in which the second network device is subject to the remote interference and the downlink beam configuration of the first network device, to determine the uplink beam at the second network device. Therefore, a process in which the second network device first performs monitoring in each direction and then determines the uplink beam can be avoided, and further, resource overheads of the second network device can be reduced.

In an embodiment, the first network device may determine, based on but not limited to information such as a service or a transmission scheduling status of the first network device, or a transmission scheduling status of a neighboring network device, the downlink SSB frequency that may be configured for the first network device in the future, the downlink transmission bandwidth configuration that may be configured for the first network device in the future, the slot format configuration that may be configured in the future, and the downlink beam configuration that may be configured in the future.

In some embodiments, the first network device may send the first auxiliary information to the second network device in, but not limited to, any one of the following three manners.

Manner 1: The first network device sends a first message to the second network device after receiving the RS sent by the second network device, where the first message is used to notify the second network device that the first network device receives the RS, and the first message carries the first auxiliary information. For example, the first message may be the message sent in operation 3 in the RIM procedure shown in FIG. 1. For a process of sending the first message, refer to operation 3 in the RIM procedure shown in FIG. 1. The first network device sends the first auxiliary information to the second network device through the first message, and the second network device may schedule the uplink transmission based on the first auxiliary information. Compared with a current-technology manner in which the second network device first performs monitoring and then schedules the uplink transmission, this manner can save network resources and reduce cell performance deterioration.

Manner 2: The first network device periodically sends the first auxiliary information to the second network device. Specifically, after receiving the RS sent by the second network device, the first network device may periodically send the first auxiliary information to the second network device over a wired link. The wired link may be a transmission link through an Xn interface or a transmission link through a core network. For example, that the first network device sends the first auxiliary information over the wired link may specifically include: The first network device determines an address of the second network device based on an identifier or the address that is of the second network device and that is carried in the RS, and sends the first auxiliary information to the second network device through the Xn interface or the core network based on the address of the second network device. The first network device periodically sends the current first auxiliary information to the second network device, so that real-time performance of the first auxiliary information can be improved. Therefore, the second network device can perform remote interference management based on the first auxiliary information with relatively high real-time performance, and further, accuracy of remote interference management can be improved.

Manner 3: The first network device may alternatively send the first auxiliary information to the second network device when downlink configuration information of the first network device is updated, where the downlink configuration information includes at least one of the following information: a downlink SSB frequency configuration, a downlink transmission bandwidth configuration, a slot format configuration, or a downlink beam configuration. Specifically, when the downlink configuration information is updated, the first network device may send the first auxiliary information to the second network device over a wired link. The wired link may be a transmission link through an Xn interface or a transmission link through a core network. The first network device sends the first auxiliary information to the second network device when the downlink configuration information is updated, so that the second network device can obtain the first auxiliary information in time, and further, accuracy of remote interference management can be improved. In addition, the first network device sends the first auxiliary information when the downlink configuration information is updated, so that signaling overheads can be reduced, and network resources can be saved.

Therefore, after receiving the first auxiliary information sent by the first network device, the second network device may indicate a terminal device served by the second network device to reduce power for performing the uplink transmission on the transmission resource corresponding to the first auxiliary information, or the second network device may not schedule the uplink transmission on the transmission resource corresponding to the first auxiliary information.

If the first auxiliary information includes the frequency domain information of the downlink transmission resource of the first network device, the second network device may indicate the terminal device served by the second network device to increase power for performing the uplink transmission in a frequency domain range corresponding to the frequency domain information. Alternatively, the second network device may indicate the terminal device served by the second network device not to perform the uplink transmission in a frequency domain range corresponding to the frequency domain information. The second network device indicates the terminal device served by the second network device to increase the power for performing the uplink transmission in the interfered—with frequency domain range, or the second network device indicates the terminal device served by the second network device not to perform the uplink transmission in the interfered—with frequency domain range, so that the remote interference to the second network device can be effectively reduced.

If the first auxiliary information includes the time domain information of the downlink transmission resource of the first network device, the second network device may indicate the terminal device served by the second network device to increase power for performing the uplink transmission in a first symbol. Alternatively, the second network device may indicate the terminal device served by the second network device not to perform the uplink transmission in a first symbol. The first symbol may be at least one symbol determined based on a symbol corresponding to the time domain information. For example, the second network device may determine the first symbol based on the transmission delay and the symbol corresponding to the time domain information. For example, the second network device determines, based on the slot format configuration of the first network device, that a symbol 1 to a symbol 5 are occupied by the downlink transmission of the first network device. It is assumed that the transmission delay is one symbol. The second network device may determine, based on the transmission delay and the symbols (namely, the symbol 1 to the symbol 5) occupied by the downlink transmission of the first network device, that symbols of the second network device that are subject to the remote interference are a symbol 2 to a symbol 6. In this case, the second network device may determine that first symbols are the symbol 2 to the symbol 6. The second network device indicates the terminal device served by the second network device to increase the power for performing the uplink transmission in the first symbol, or indicates the terminal device served by the second network device not to perform the uplink transmission in the first symbol, so that the remote interference to the second network device can be effectively reduced.

In an example description, the symbol may be an orthogonal frequency division multiplexing (OFDM) symbol.

If the first auxiliary information includes the beam information of the downlink transmission of the first network device, the second network device may determine the uplink beam based on the beam information. For example, when determining that the second network device is subject to the remote interference, the second network device may determine the direction in which the second network device is subject to the remote interference. Therefore, after receiving the first auxiliary information, the second network device may determine the direction range of the signal from the first network device with reference to the direction in which the second network device is subject to the remote interference and the downlink beam information of the first network device, to determine the uplink beam at the second network device. Therefore, the process in which the second network device first performs monitoring in each direction and then determines the uplink beam can be avoided, and further, resource overheads of the second network device can be reduced.

In addition, in a possible implementation, the first network device may further receive second auxiliary information sent by the second network device. The second auxiliary information includes at least one of the following information: frequency domain information of the uplink transmission of the second network device, information about a frequency that is in an uplink transmission resource of the second network device and that is subject to the interference in frequency domain, a quantity of symbols that are in the uplink transmission resource of the second network device and that are subject to the interference in time domain, a slot that is in the uplink transmission resource of the second network device and that is subject to the interference in time domain and/or an interfered—with symbol in the slot, a slot format configuration of the second network device, or beam information of the uplink transmission scheduled by the second network device. The frequency domain information may indicate a frequency domain resource occupied by the uplink transmission scheduled by the second network device. For example, the frequency domain information may indicate a frequency range occupied by the uplink transmission scheduled by the second network device. The time domain information may indicate slot format configurations of uplink and downlink transmission of the second network device, so that at least one symbol occupied by the uplink transmission scheduled by the second network device, at least one symbol occupied by the downlink transmission of the second network device, and the like may be determined based on the slot format configurations. The beam information may indicate a beam configuration used for the uplink transmission scheduled by the second network device. For example, the beam information may indicate a direction of a beam used for the uplink transmission scheduled by the second network device.

It should be understood that the first network device and/or the second network device may have different function-separated architectures. For example, the first network device may receive the second auxiliary information sent by the second network device. Alternatively, the first network device may receive the second auxiliary information sent by the second network device through a second CU or a second CU-CP. Alternatively, the first network device may receive, through a first CU or a first CU-CP, the second auxiliary information sent by the second network device. Alternatively, the first network device may receive, through a first CU or a first CU-CP, the second auxiliary information sent by the second network device through a second CU or a second CU-CP.

In an example description, the first network device may perform coordination based on the first auxiliary information and the second auxiliary information, to further reduce performance deterioration during the remote interference management. For example, after receiving the second auxiliary information, the first network device may further mitigate the remote interference based on the second auxiliary information. For example, a frequency, a symbol, a beam direction, or the like in which little remote interference is caused to the second network device is selected for the downlink transmission, or power of the downlink transmission that causes the remote interference to the second network device is reduced. Optionally, after performing remote interference mitigation, the first network device sends the first auxiliary information of the first network device to the second network device again, so that the second network device determines a time-frequency resource for the scheduled uplink transmission, or further performs remote interference mitigation, and so on.

In an embodiment, if the second auxiliary information includes the frequency domain information corresponding to the uplink transmission resource of the second network device, a frequency domain range of the first transmission resource may be the frequency domain range indicated by the second auxiliary information. Therefore, the first network device may stop performing the downlink transmission in the frequency domain range indicated by the second auxiliary information, or may reduce power for performing the downlink transmission in the frequency domain range indicated by the second auxiliary information. The first network device reduces the power for the downlink transmission in the frequency domain range in which the remote interference is generated, or avoids performing the downlink transmission in the frequency domain range in which the remote interference is generated, so that the remote interference to the second network device can be effectively reduced. The first network device avoids the frequency domain resource for the uplink transmission scheduled by the second network device, so that the remote interference to the second network device can be reduced.

In an embodiment, if the second auxiliary information includes the information about the frequency that is in the uplink transmission resource of the second network device and that is subject to the interference in frequency domain, a frequency domain range of the first transmission resource may be the frequency domain range indicated by the second auxiliary information. Therefore, the first network device may stop performing the downlink transmission in the frequency domain range indicated by the second auxiliary information, or may reduce power for performing the downlink transmission in the frequency domain range indicated by the second auxiliary information. The first network device reduces the power for the downlink transmission in the frequency domain range in which the remote interference is generated, or avoids performing the downlink transmission in the frequency domain range in which the remote interference is generated, so that the remote interference to the second network device can be effectively reduced. The first network device avoids the frequency domain resource for the uplink transmission scheduled by the second network device, so that the remote interference to the second network device can be reduced.

Figure 5:
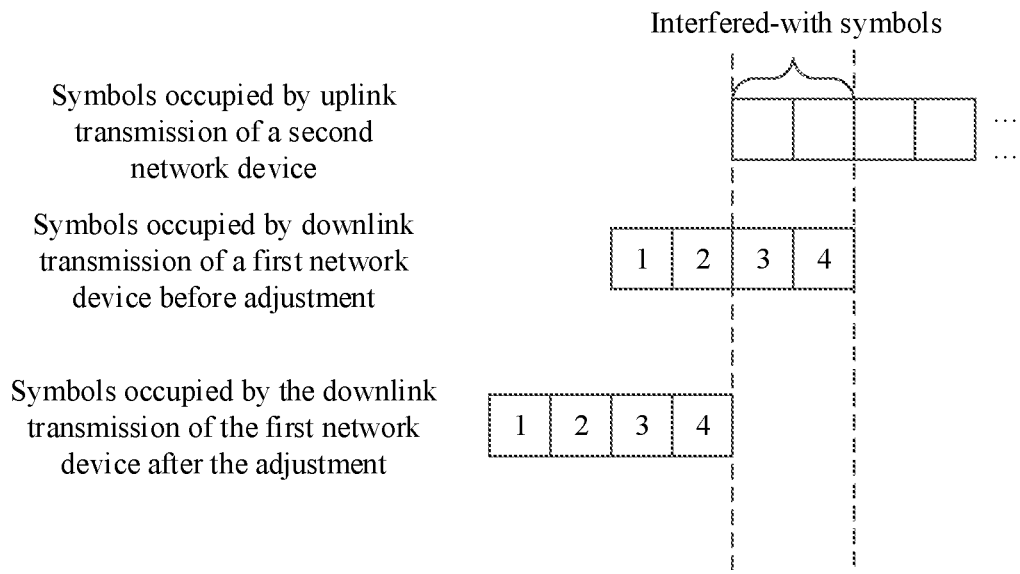
FIG. 5 is a schematic diagram of adjusting a symbol for downlink transmission according to an embodiment of this application.

If the second auxiliary information includes the quantity of symbols that are in the uplink transmission resource of the second network device and that are subject to the interference in time domain, the slot format configuration of the second network device, or the slot that is in the uplink transmission resource of the second network device and that is subject to the interference in time domain and/or the interfered—with symbol in the slot, a symbol in the first transmission resource in time domain may be a symbol determined based on the symbol indicated by the second auxiliary information. Therefore, the first network device may adjust a symbol for the downlink transmission, based on the quantity of symbols that are in the uplink transmission resource of the second network device and that are subject to the interference in time domain, the slot format configuration of the second network device, or the slot that is in the uplink transmission resource of the second network device and that is subject to the interference in time domain and/or the interfered—with symbol in the slot. For example, the downlink transmission of the first network device occupies four symbols and the second auxiliary information includes a quantity 2 of symbols that are in the uplink transmission resource of the second network device and that are subject to the interference in time domain. The first network device may offset the symbols occupied for the downlink transmission forward by two symbols, as shown in FIG. 5.

The first network device adjusts the symbols used for the downlink transmission, based on the quantity of symbols that are in the uplink transmission resource of the second network device and that are subject to the interference in time domain, the slot format configuration of the second network device, or the slot that is in the uplink transmission resource of the second network device and that is subject to the interference in time domain and/or the interfered—with symbol in the slot, so that the remote interference to the second network device can be effectively reduced.

If the second auxiliary information includes the beam information of the uplink transmission scheduled by the second network device, a beam corresponding to the first transmission resource may be a beam determined based on the second auxiliary information. For example, the beam corresponding to the first transmission resource may be determined based on location information of the second network device and uplink beam information of the second network device. Therefore, the first network device may stop performing the downlink transmission on the beam corresponding to the first transmission resource, or may reduce power for performing the downlink transmission on the beam corresponding to the first transmission resource, so that the remote interference to the second network device can be effectively reduced.

Figure 6:
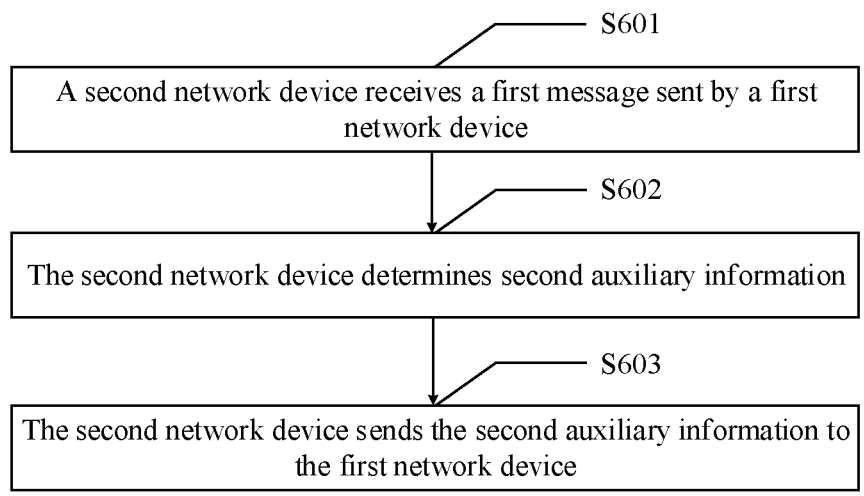
FIG. 6 is a flowchart of another remote interference management method according to an embodiment of this application.

FIG. 6 is a flowchart of another remote interference management method according to this application. The method includes the following operations.

S601: A second network device receives a first message sent by a first network device, where the first message is used to notify the second network device that the first network device receives a reference signal RS, and the RS is used to indicate that the second network device is subject to remote interference. The first network device may be any radio access network device in an aggressor area, and the second network device may be any radio access network device in a victim area.

In an example description, the RS may carry an identifier of the second network device. The first network device may search for an address of the second network device based on a pre-stored correspondence between an identifier and an address. Alternatively, the first network device obtains a correspondence between an identifier and an address from another network device, so that the first network device can learn of an address of the second network device.

In another example description, the RS may further carry an address of the second network device, so that the first network device can learn of the address of the second network device.

Certainly, the RS may further carry other information, which is not listed one by one herein. The first message may be the message sent in operation 3 in the RIM procedure shown in FIG. 1. For a process of sending the first message, refer to operation 3 in the RIM procedure shown in FIG. 1.

In some implementations, the second network device may send the RS to the first network device through an air interface. For details, refer to operation 2 in the RIM procedure shown in FIG. 1.

S602: The second network device determines second auxiliary information, where the second auxiliary information includes at least one of the following information: frequency domain information corresponding to an uplink transmission resource of the second network device, information about a frequency that is in the uplink transmission resource of the second network device and that is subject to the interference in frequency domain, a quantity of symbols that are in the uplink transmission resource of the second network device and that are subject to the interference in time domain, a slot that is in the uplink transmission resource of the second network device and that is subject to the interference in time domain and/or an interfered—with symbol in the slot, a slot format configuration of the second network device, or beam information of uplink transmission scheduled by the second network device.

The frequency domain information may indicate a frequency domain resource occupied by the uplink transmission scheduled by the second network device. For example, the frequency domain information may indicate a frequency range occupied by the uplink transmission scheduled by the second network device. The time domain information may indicate slot format configurations of uplink and downlink transmission of the second network device, so that at least one symbol occupied by the uplink transmission scheduled by the second network device, at least one symbol occupied by the downlink transmission of the second network device, and the like may be determined based on the slot format configurations. The beam information may indicate a beam configuration used for the uplink transmission scheduled by the second network device. For example, the beam information may indicate a direction of a beam used for the uplink transmission scheduled by the second network device.

In an example description, the symbol in this embodiment of this application may be an orthogonal frequency division multiplexing (OFDM) symbol.

The frequency domain information corresponding to the uplink transmission resource of the second network device may include an SSB frequency used for the scheduled uplink transmission. Alternatively, the frequency domain information corresponding to the uplink transmission resource of the second network device may include an SSB frequency and a transmission bandwidth configuration that are used for the scheduled uplink transmission.

S603: The second network device sends the second auxiliary information to the first network device.

In some implementations, a function-separated architecture of the second network device may be shown in FIG. 3A. When the second network device sends the second auxiliary information to the first network device, the second network device (namely, a second DU) may send the second auxiliary information to the first network device. Specifically, the second network device (namely, the second DU) may send the second auxiliary information to the first network device through a CU (which is referred to as a second CU) connected to the second network device. In other words, the second network device (namely, the second DU) sends the second auxiliary information to the second CU, and then the second CU sends the second auxiliary information to the first network device. A function-separated architecture of the first network device may also be shown in FIG. 3A. Correspondingly, the first network device (namely, a first DU) may receive the second auxiliary information. Specifically, the first network device (namely, the first DU) may receive the second auxiliary information through a CU (which is referred to as a first CU) connected to the first network device. In other words, the first CU receives the second auxiliary information from the second network device, and then the first CU sends the second auxiliary information to the first network device (namely, the first DU).

A function-separated architecture of the second network device may alternatively be shown in FIG. 3B. When the second network device sends the second auxiliary information to the first network device, the second network device (namely, a second DU) may send the second auxiliary information to the first network device. Specifically, the second network device (namely, the second DU) may send the second auxiliary information to the first network device through a CU-CP (which is referred to as a second CU-CP) connected to the second network device. In other words, the second network device (namely, the second DU) sends the second auxiliary information to the second CU-CP, and then the second CU-CP sends the second auxiliary information to the first network device. A function-separated architecture of the first network device may also be shown in FIG. 3B. Correspondingly, the first network device (namely, a first DU) may receive the second auxiliary information. Specifically, the first network device (namely, the first DU) may receive the second auxiliary information through a CU-CP (which is referred to as a first CU-CP) connected to the first network device. In other words, the first CU-CP receives the second auxiliary information from the second network device, and then the first CU-CP sends the second auxiliary information to the first network device (namely, the first DU).

It should be understood that the function-separated architectures of the first network device and the second network device may be different. For example, the function-separated architecture of the second network device is shown in FIG. 3A, and the function-separated architecture of the first network device is shown in FIG. 3B. In this case, specifically, a second DU may send the first auxiliary information to a first CU-CP through a second CU, and then the first CU-CP sends the second auxiliary information to a first DU. Alternatively, the function-separated architecture of the second network device is shown in FIG. 3B, and the function-separated architecture of the first network device is shown in FIG. 3A. In this case, specifically, a second DU may send the first auxiliary information to a first CU through a second CU-CP, and then the first CU sends the second auxiliary information to a first DU. Alternatively, one of the first network device or the second network device has a function-separated architecture. For example, the first network device is a first DU, and the second network device is a gNB or an eNB; or the first network device is a gNB or an eNB, and the second network device is a second DU.

In this embodiment of this application, the network device (namely, the second network device) in the victim area sends the auxiliary information to the network device (namely, the first network device) in the aggressor area, so that the network device in the victim area can mitigate the remote interference based on the transmission resource indicated by the auxiliary information. For example, the network device in the aggressor area may determine, based on the auxiliary information, a frequency on which the remote interference is generated, a symbol or a beam direction in which the remote interference is generated, or the like; and the network device in the aggressor area stops or reduces the downlink transmission on the frequency on which the remote interference is generated, or in the symbol or the beam direction in which the remote interference is generated. For example, the second auxiliary information includes the SSB frequency and the transmission bandwidth configuration for the uplink transmission scheduled by the second network device. Therefore, after receiving the second auxiliary information, the first network device may learn of the frequency range occupied by the uplink transmission resource scheduled by the second network device, so that the first network device may stop performing downlink transmission in the corresponding frequency range, to reduce the remote interference to the uplink transmission. In this embodiment of this application, the network device in the aggressor area may directly mitigate the remote interference. In addition, different from a method in which the network device in the victim area includes corresponding information in the RS signal, in this embodiment of this application, the second network device may send the auxiliary information over a wired link. The wired link may be a transmission link through an Xn interface or a transmission link through a core network. Therefore, integrity of the auxiliary information can be ensured. In addition, compared with a static configuration, for example, configuring a longer uplink-downlink time interval of the aggressor area and a longer uplink-downlink time interval of the victim area, or configuring different frequencies for a downlink of the aggressor area and an uplink of the victim area, in this embodiment of this application, cell performance deterioration can be effectively reduced.

In some implementations, the second network device may send the second auxiliary information to the first network device in, but not limited to, any one of the following three manners.

Manner 1: The second network device may periodically send the second auxiliary information to the first network device. Specifically, after receiving the first message, the second network device may send the second auxiliary information to the first network device over a wired link. The wired link may be a transmission link through an Xn interface or a transmission link through a core network. To be specific, the first message may carry an identifier or an address of the first network device, and the second network device may determine the address of the first network device based on the first message, and periodically send the current second auxiliary information to the first network device based on the address of the first network device through the Xn interface, the core network, or the like. The second network device periodically sends the second auxiliary information to the first network device, so that real-time performance of the second auxiliary information can be improved. Therefore, the first network device can perform remote interference management based on the second auxiliary information with relatively high real-time performance, and further, accuracy of the remote interference management can be improved.

Manner 2: The second network device sends the second auxiliary information to the first network device when uplink configuration information of the second network device is updated, where the uplink configuration information includes at least one of the following information: an uplink SSB frequency configuration, an uplink transmission bandwidth configuration, a slot format configuration, or an uplink beam configuration. Specifically, when the uplink configuration information is updated, the second network device may send the second auxiliary information to the first network device over a wired link. The wired link may be a transmission link through an Xn interface or a transmission link through a core network. To be specific, the first message may carry an identifier or an address of the first network device, and the second network device may determine the address of the first network device based on the first message, and send the second auxiliary information to the first network device based on the address of the first network device through the Xn interface, the core network, or the like. The second network device sends the second auxiliary information to the first network device when the uplink configuration information is updated, so that the first network device can obtain the second auxiliary information in time, and further, accuracy of the remote interference management can be improved. In addition, the second network device sends the second auxiliary information when the uplink configuration information is updated, so that signaling overheads can be reduced, and network resources can be saved.

Manner 3: After receiving the first message, the second network device sends the second auxiliary information to the first network device. Specifically, after receiving the first message, the second network device may send the second auxiliary information to the first network device over a wired link. The wired link may be a transmission link through an Xn interface or a transmission link through a core network. To be specific, the first message may carry an identifier or an address of the first network device, and the second network device may determine the address of the first network device based on the first message, and send the second auxiliary information to the first network device based on the address of the first network device through the Xn interface, the core network, or the like. After receiving the first message, the second network device sends the second auxiliary information to the first network device over the wired link. Compared with a manner in which the second network device includes the second auxiliary information in the RS, this manner can ensure integrity of the second auxiliary information.

In addition, the second network device may further receive first auxiliary information sent by the first network device, where the first auxiliary information includes at least one of the following information: frequency domain information of a downlink transmission resource of the first network device, time domain information of the downlink transmission resource of the first network device, or beam information corresponding to the downlink transmission resource of the first network device. The frequency domain information may indicate a frequency domain resource occupied by downlink transmission of the first network device. For example, the frequency domain information may indicate a frequency range occupied by the downlink transmission of the first network device. The time domain information may indicate a time domain resource occupied by the downlink transmission of the first network device. For example, the time domain information may indicate slot format configurations of uplink and downlink transmission of the first network device, so that at least one symbol for the uplink transmission scheduled by the first network device, at least one symbol for the downlink transmission of the first network device, and the like may be determined based on the slot format configurations. The beam information may indicate a beam configuration used for the downlink transmission of the first network device. For example, the beam information may indicate a direction of a beam used for the downlink transmission of the first network device.

In an example description, the second network device may perform coordination based on the first auxiliary information and the second auxiliary information, to further reduce performance deterioration during the remote interference management. For example, after receiving the first auxiliary information, the second network device may further mitigate the remote interference based on the first auxiliary information. For example, the second network device avoids scheduling the uplink transmission on an interfered—with frequency, or in an interfered—with symbol or beam direction, or the second network device may indicate a terminal device served by the second network device to increase power for performing the uplink transmission on an interfered—with frequency, or in an interfered—with symbol or beam direction. Optionally, after performing remote interference mitigation, the second network device sends the second auxiliary information of the second network device to the first network device again, so that the first network device determines a time-frequency resource and the like for performing downlink transmission.

For example, the frequency domain information of the downlink transmission resource of the first network device may include at least one downlink SSB frequency. Alternatively, the frequency domain information of the downlink transmission resource of the first network device may include at least one downlink SSB frequency and at least one downlink transmission bandwidth configuration. The at least one downlink SSB frequency includes a current downlink SSB frequency of the first network device, and the at least one downlink transmission bandwidth configuration includes a current downlink transmission bandwidth configuration of the first network device. In this embodiment of this application, the downlink SSB frequency may be understood as a frequency occupied by a downlink SSB. Therefore, the second network device may determine, based on the downlink SSB frequency and the downlink transmission bandwidth configuration of the first network device, a frequency range in which the first network device generates the remote interference. Therefore, the second network device may schedule the uplink transmission outside the frequency range, to reduce impact of the remote interference on the uplink transmission.

The time domain information corresponding to the downlink transmission resource of the first network device may include at least one slot format configuration, and the at least one slot format configuration includes a current slot format configuration of the first network device. In addition, the at least one slot format may further include a slot format configuration that may be configured for the first network device in the future. Therefore, after receiving the first auxiliary information, the second network device may determine, based on the slot format configuration of the first network device, a symbol occupied by the downlink transmission of the first network device, and then the second network device may determine, based on the symbol occupied by the downlink transmission of the first network device, a symbol for the uplink transmission scheduled by the second network device. For example, the second network device determines, based on the slot format configuration of the first network device, that a symbol 1 to a symbol 5 are occupied by the downlink transmission of the first network device. It is assumed that there is no transmission delay. In this case, the second network device may schedule the uplink transmission starting from a symbol 6. For another example, the second network device determines, based on the slot format configuration of the first network device, that a symbol 1 to a symbol 5 are occupied by the downlink transmission of the first network device. It is assumed that a transmission delay is one symbol. The second network device may determine, based on the transmission delay and the symbols (namely, the symbol 1 to the symbol 5) occupied by the downlink transmission of the first network device, that symbols of the second network device that are subject to the remote interference are a symbol 2 to a symbol 6. In this case, the second network device may schedule the uplink transmission starting from a symbol 7, to reduce impact of the remote interference on the uplink transmission.

The downlink beam information of the first network device may include at least one downlink beam configuration, and the at least one downlink beam configuration includes a current downlink beam configuration of the first network device. In addition, the at least one downlink beam configuration may further include a downlink beam configuration that may be configured for the first network device in the future.

In an embodiment, the first network device may determine, based on but not limited to information such as a service or a transmission scheduling status of the first network device, or a transmission scheduling status of a neighboring network device, the downlink SSB frequency that may be configured for the first network device in the future, the downlink transmission bandwidth configuration that may be configured for the first network device in the future, the slot format configuration that may be configured in the future, and the downlink beam configuration that may be configured in the future.

Therefore, the second network device may schedule the uplink transmission on a first transmission resource, where the first transmission resource is a transmission resource other than a second transmission resource, and the second transmission resource is a transmission resource corresponding to the first auxiliary information. Alternatively, the second network device may indicate the terminal device served by the second network device to increase power for performing the uplink transmission on the second transmission resource.

If the first auxiliary information includes the frequency domain information of the downlink transmission resource of the first network device, a frequency of the first transmission resource may be any frequency outside the frequency domain range indicated by the first auxiliary information. Therefore, the second network device may indicate the terminal device served by the second network device to increase power for performing the uplink transmission in the frequency domain range indicated by the first auxiliary information. Alternatively, the second network device may avoid scheduling the uplink transmission in the frequency domain range indicated by the first auxiliary information. The second network device indicates the terminal device served by the second network device to increase the power for performing the uplink transmission in the interfered—with frequency domain range, or indicates the terminal device served by the second network device not to perform the uplink transmission in the interfered—with frequency domain range, so that the remote interference to the second network device can be effectively reduced.

If the first auxiliary information includes the time domain information of the downlink transmission resource of the first network device, the second network device may indicate the terminal device served by the second network device to increase power for performing the uplink transmission in a first symbol. Alternatively, the second network device may indicate the terminal device served by the second network device not to perform the uplink transmission in a first symbol. The first symbol may be at least one symbol determined based on the symbol corresponding to the time domain information. For example, the second network device may determine the first symbol based on a transmission delay and the symbol corresponding to the time domain information. For example, the second network device determines, based on the slot format configuration of the first network device, that a symbol 1 to a symbol 5 are occupied by the downlink transmission of the first network device. It is assumed that the transmission delay is one symbol. The second network device may determine, based on the transmission delay and the symbols (namely, the symbol 1 to the symbol 5) occupied by the downlink transmission of the first network device, that symbols of the second network device that are subject to the remote interference are a symbol 2 to a symbol 6. In this case, the second network device may determine that first symbols are the symbol 2 to the symbol 6. The second network device indicates the terminal device served by the second network device to increase the power for performing the uplink transmission in the first symbol, or indicates the terminal device served by the second network device not to perform the uplink transmission in the first symbol, so that the remote interference to the second network device can be effectively reduced.

If the first auxiliary information includes the beam information corresponding to the downlink transmission resource of the first network device, a beam corresponding to the first transmission resource may be a beam determined based on the first auxiliary information. For example, the beam corresponding to the first transmission resource may be determined based on a direction in which the second network device is subject to the interference and the downlink beam information of the first network device. The direction in which the second network device is subject to the interference may be determined by the second network device when the second network device determines that the second network device is subject to the remote interference. Therefore, the second network device may indicate the terminal device served by the second network device to increase power for performing the uplink transmission on the beam indicated by the first auxiliary information. Alternatively, the second network device may avoid scheduling the uplink transmission on the beam indicated by the first auxiliary information. Therefore, the remote interference to the second network device can be effectively reduced.

In addition, if the radio access network devices in this embodiment of this application use the architecture shown in FIG. 3A, information exchange between the radio access network device in the aggressor area and the radio access network device in the victim area needs to be completed through CUs. For example, the first network device sends information to the second network device through a CU connected to the first network device or receives, through the CU connected to the first network device, information sent by the second network device, and the second network device sends information to the first network device through a CU connected to the second network device or receives, through the CU connected to the second network device, information sent by the first network device. However, during remote interference management, an operation, administration and maintenance (OAM) device may group DUs having similar remote interference characteristics in the victim area into one set. The DUs having the similar remote interference characteristics may be subject to remote interference generated by a same aggressor area. In addition, an identifier (set ID) is allocated to each set. When the radio access network device in the aggressor area and the radio access network device in the victim area exchange information through the CU, the CU needs to know grouping information of a DU connected to the CU.

Based on this, an embodiment of this application provides a remote interference management method, to enable the CU to learn of a grouping status of the DU after the OAM groups the DUs, so that the radio access network device in the aggressor area and the radio access network device in the victim area may exchange information through the CU.

Embodiment 1

Figure 7:
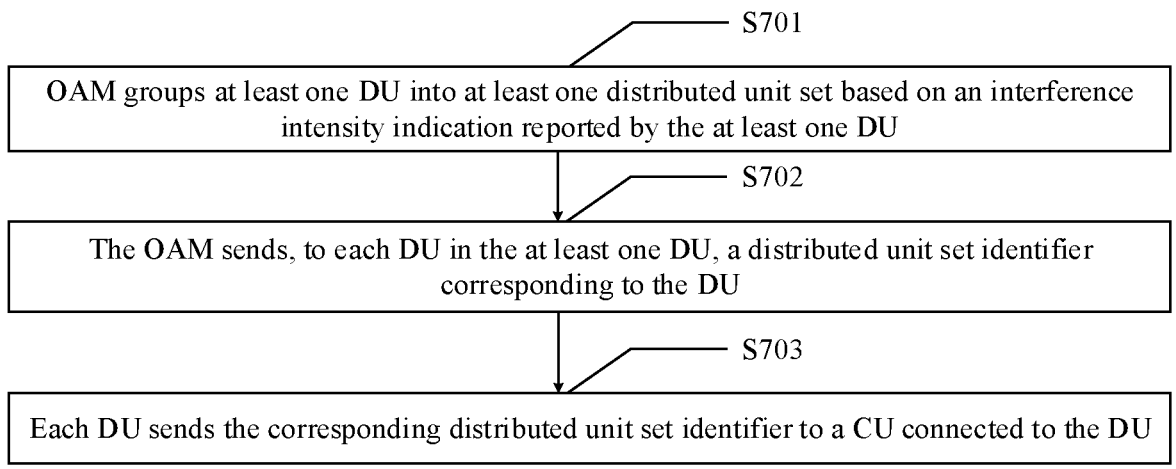
FIG. 7 is a flowchart of a DU grouping method according to an embodiment of this application.

A remote interference management method may be shown in FIG. 7, and the method includes the following operations.

S701: OAM groups at least one DU into at least one distributed unit set based on an interference intensity indication reported by the at least one DU.

During specific implementation, the OAM may group DUs with similar remote interference characteristics into one set based on the interference intensity indication reported by the DU.

S702: The OAM sends, to each DU in the at least one DU, a distributed unit set identifier corresponding to the DU.

When determining a distributed unit set identifier corresponding to a distributed unit set, the OAM may determine the distributed unit set identifier with reference to an address or an identifier of a CU connected to a DU included in the distributed unit set. In other words, the distributed unit set identifier may be associated with the address or the identifier of the CU connected to the DU included in the distributed unit set. Therefore, another device may determine the address or the identifier of the CU based on the distributed unit set identifier of the distributed unit set, and may route, to the CU, information to be sent to the DU in the distributed unit set. Then, the CU may send the information to the DU based on grouping information.

Alternatively, when determining a distributed unit set identifier corresponding to a distributed unit set, the OAM may determine the distributed unit set identifier with reference to an identifier or an address of an access and mobility management function (AMF) connected to a CU corresponding to the distributed unit set. The CU corresponding to the distributed unit set is a CU connected to a DU included in the distributed unit set. In other words, the distributed unit set identifier may be associated with the identifier or the address of the AMF connected to the CU corresponding to the distributed unit set. Therefore, another device may determine the address or the identifier of the AMF based on the distributed unit set identifier, and may route, to the AMF, information to be sent to the DU in the distributed unit set. The AMF may determine an address or an identifier of the CU based on grouping information and the like that are obtained from the OAM, and send the information to the CU. The CU may send the information to the DU based on the grouping information.

In addition, when determining the distributed unit set identifier corresponding to the distributed unit set, the OAM may further determine the distributed unit set identifier with reference to other information. Examples are not listed one by one herein.

S703: Each DU sends the corresponding distributed unit set identifier to a CU connected to the DU.

For better understanding of the method in Embodiment 1, descriptions are provided below by using an example in which a victim area includes two CUs: a CU 1 and a CU 2, the CU 1 is connected to five DUs: a DU 1 to a DU 5, and the CU 2 is connected to three DUs: a DU 6 to a DU 8. It should be understood that this is merely an example for description herein, and a quantity of CUs, a quantity of DUs, a grouping manner, and the like are not specifically limited.

Figure 8:
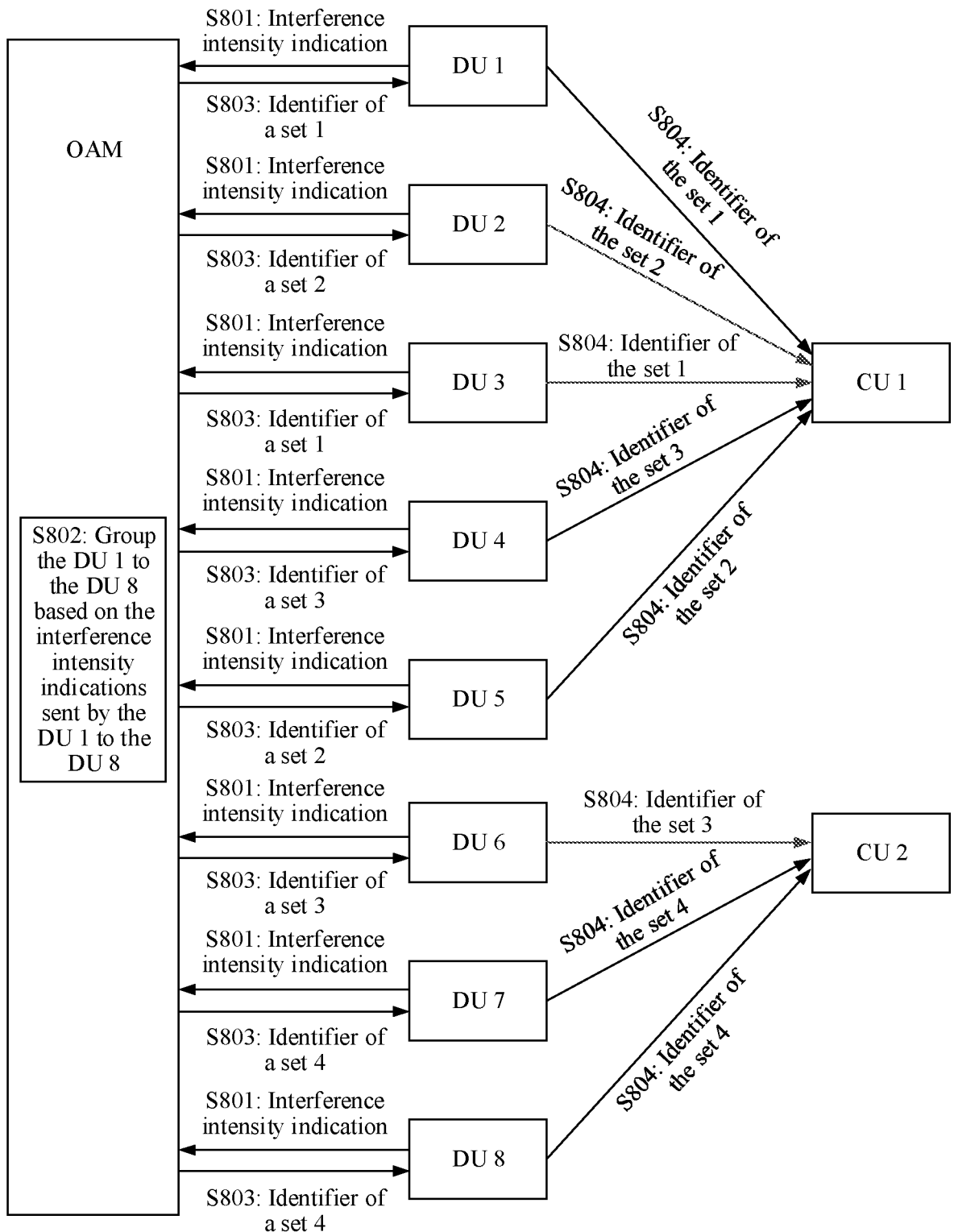
FIG. 8 is a flowchart of another DU grouping method according to an embodiment of this application.

A specific process may be shown in FIG. 8.

S801: OAM receives interference intensity indications sent by the DU 1 to the DU 8.

S802: The OAM groups the DU 1 to the DU 8 based on the interference intensity indications sent by the DU 1 to the DU 8.

Descriptions are provided below by using an example in which a grouping result is as follows: The DU 1 and the DU 3 are grouped into a set, and the distributed unit set is a set 1; the DU 2 and the DU 5 are grouped into a set, and the distributed unit set is a set 2; the DU 4 and the DU 6 are grouped into a set, and the distributed unit set is a set 3; and the DU 7 and the DU 8 are grouped into a set, and the distributed unit set is a set 4.

For example, a distributed unit set identifier of a distributed unit set may be associated with an identifier or an address of a CU connected to a DU in the distributed unit set. The set 1 is used as an example, and an identifier of the set 1 may be associated with an identifier or an address of the CU 1. The set 3 is used as another example, and an identifier of the set 3 may be associated with an identifier or an address of the CU 1, or an identifier of the set 3 may be associated with an identifier or an address of the CU 2.

S803: The OAM sends a corresponding distributed unit set identifier to each of the DU 1 to the DU 8.

The foregoing grouping result is used as an example. The OAM may send, to the DU 1, an identifier of the distributed unit set, namely, the set 1, corresponding to the DU 1; the OAM may send, to the DU 2, an identifier of the distributed unit set, namely, the set 2, corresponding to the DU 2; the OAM may send, to the DU 3, an identifier of the distributed unit set, namely, the set 1, corresponding to the DU 3; the OAM may send, to the DU 4, an identifier of the distributed unit set, namely, the set 3, corresponding to the DU 4; the OAM may send, to the DU 5, an identifier of the distributed unit set, namely, the set 2, corresponding to the DU 5; the OAM may send, to the DU 6, an identifier of the distributed unit set, namely, the set 3, corresponding to the DU 6; the OAM may send, to the DU 7, an identifier of the distributed unit set, namely, the set 4, corresponding to the DU 7; and the OAM may send, to the DU 8, an identifier of the distributed unit set, namely, the set 4, corresponding to the DU 8.

S804: The DU 1 to the DU 8 each send the distributed unit set identifier to the connected CU.

The foregoing grouping result is used as an example. The DU 1 sends the identifier of the set 1 to the CU 1, the DU 2 sends the identifier of the set 2 to the CU 1, the DU 3 sends the identifier of the set 1 to the CU 1, the DU 4 sends the identifier of the set 3 to the CU 1, and the DU 5 sends the identifier of the set 2 to the CU 1. Therefore, the CU 1 may determine grouping statuses of the DU 1 to the DU 5. The DU 6 sends the identifier of the set 3 to the CU 2, the DU 7 sends the identifier of the set 4 to the CU 2, and the DU 8 sends the identifier of the set 4 to the CU 2. Therefore, the CU 2 may determine grouping statuses of the DU 6 to the DU 8.

Based on the methods shown in FIG. 7 and FIG. 8, the CU in the victim area may determine the grouping status of the connected DU, so that a radio access network device in the victim area may exchange information with a radio access network device in an aggressor area through the CU. For example, the DU 1 and the DU 2 separately send RSs to an aggressor device of the set 1, and the RSs each carry the identifier of the set 1. Therefore, after receiving the RSs, a first network device may determine an address of the CU 1 based on the identifier that is of the set 1 and that is carried in the RSs. The first network device determines first auxiliary information, and sends the first auxiliary information to the CU 1. Optionally, the CU 1 sends second auxiliary information of the DU 1 and the DU 2 to the first network device.

Embodiment 2

Figure 9:
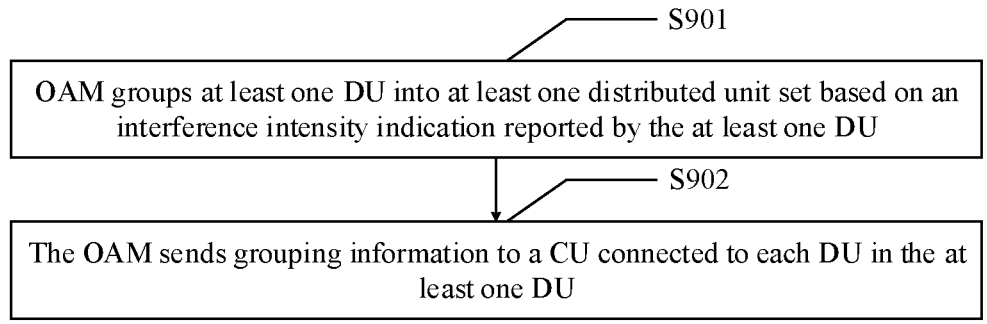
FIG. 9 is a flowchart of still another DU grouping method according to an embodiment of this application.

A remote interference management method may be shown in FIG. 9, and the method includes the following operations.

S901: OAM groups at least one DU into at least one distributed unit set based on an interference intensity indication reported by the at least one DU.

S902: The OAM sends grouping information to a CU connected to each DU in the at least one DU. The grouping information includes an identifier of a distributed unit set and an identifier of the DU that is connected to the CU and that is in the distributed unit set.

When determining a distributed unit set identifier corresponding to a distributed unit set, the OAM may determine the distributed unit set identifier with reference to an address or an identifier of a CU connected to a DU included in the distributed unit set. In other words, the distributed unit set identifier may be associated with the address or the identifier of the CU connected to the DU included in the distributed unit set. Therefore, another device may determine the address or the identifier of the CU based on the distributed unit set identifier of the distributed unit set, and may route, to the CU, information to be sent to the DU in the distributed unit set. Then, the CU may send the information to the DU based on grouping information.

Alternatively, when determining a distributed unit set identifier corresponding to a distributed unit set, the OAM may determine the distributed unit set identifier with reference to an identifier or address of an access and mobility management function (AMF) connected to a CU corresponding to the distributed unit set. The CU corresponding to the distributed unit set is a CU connected to a DU included in the distributed unit set. In other words, the distributed unit set identifier may be associated with the identifier or the address of the AMF connected to the CU corresponding to the distributed unit set. Therefore, another device may determine the address or the identifier of the AMF based on the distributed unit set identifier, and may route, to the AMF, information to be sent to the DU in the distributed unit set. The AMF may determine an address or an identifier of the CU based on grouping information and the like that are obtained from the OAM, and send the information to the CU. The CU may send the information to the DU based on the grouping information.

In addition, when determining the distributed unit set identifier corresponding to the distributed unit set, the OAM may further determine the distributed unit set identifier with reference to other information. Examples are not listed one by one herein.

During specific implementation, the OAM may further send the grouping information to each of the at least one DU, or the OAM may further send the corresponding distributed unit set identifier to each of the at least one DU.

For better understanding of the method in Embodiment 2, descriptions are provided below by using an example in which a victim area includes two CUs: a CU 1 and a CU 2, the CU 1 is connected to a DU 1 to a DU 5, and the CU 2 is connected to a DU 6 to a DU 8. It should be understood that this is merely an example for description herein, and a quantity of CUs, a quantity of DUs, a grouping manner, and the like are not specifically limited.

Figure 10:
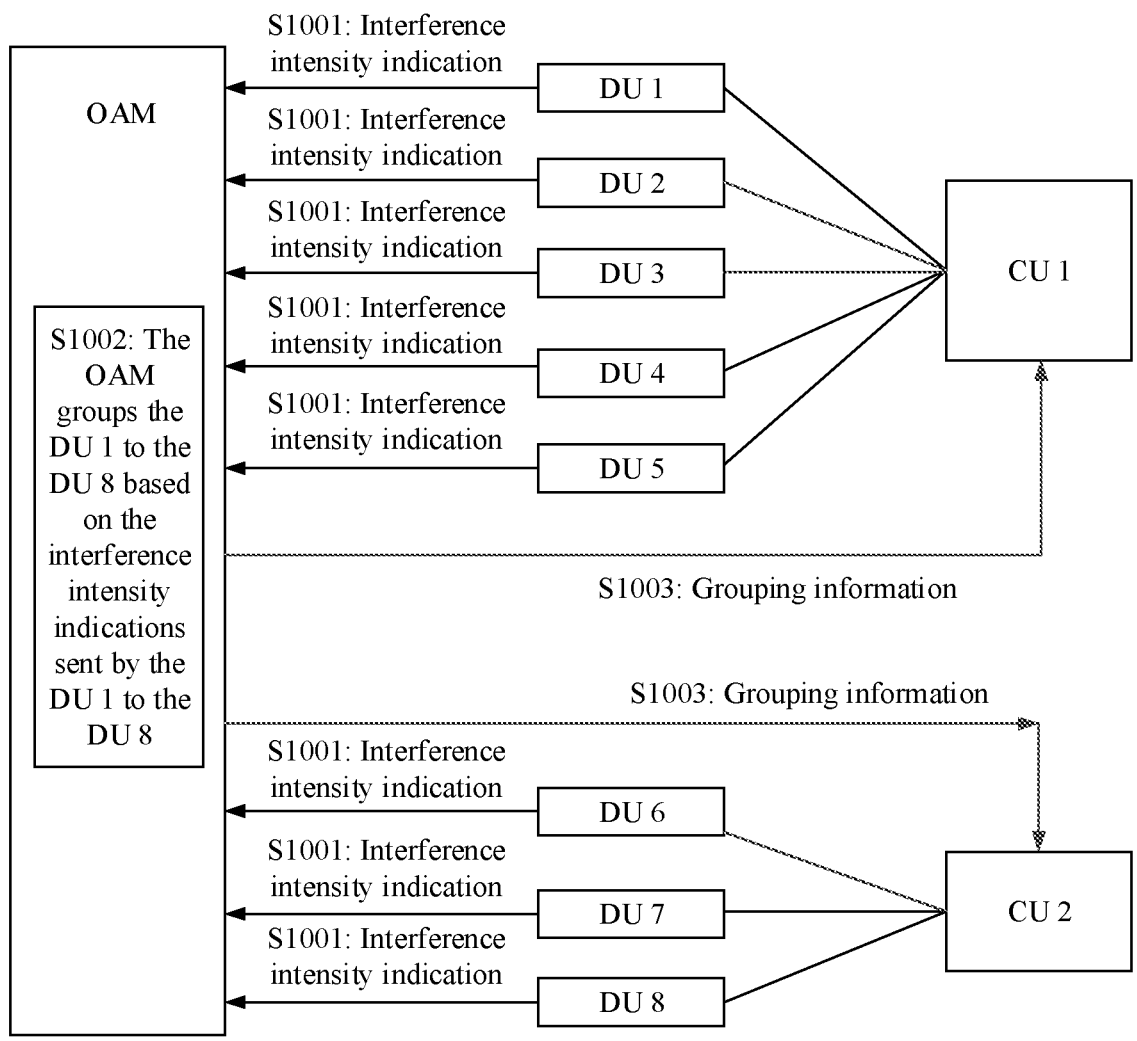
FIG. 10 is a flowchart of yet another DU grouping method according to an embodiment of this application.

A specific process may be shown in FIG. 10.

S1001: OAM receives interference intensity indications sent by the DU 1 to the DU 8.

S1002: The OAM groups the DU 1 to the DU 8 based on the interference intensity indications sent by the DU 1 to the DU 8.

Descriptions are provided below by using an example in which a grouping result is as follows: The DU 1 and the DU 3 are grouped into a set, and the distributed unit set is a set 1; the DU 2 and the DU 5 are grouped into a set, and the distributed unit set is a set 2; the DU 4 and the DU 6 are grouped into a set, and the distributed unit set is a set 3; and the DU 7 and the DU 8 are grouped into a set, and the distributed unit set is a set 4.

For example, a distributed unit set identifier of a distributed unit set may be associated with an identifier or an address of a CU connected to a DU in the distributed unit set. The set 1 is used as an example, and an identifier of the set 1 may be associated with an identifier or an address of the CU 1. The set 3 is used as another example, and an identifier of the set 3 may be associated with an identifier or an address of the CU 1, or an identifier of the set 3 may be associated with an identifier or an address of the CU 2.

S1003: The OAM sends grouping information to the CU 1 and the CU 2.

In addition, the OAM may further send grouping information to the DU 1 to the DU 8, or the OAM may further send a corresponding distributed unit set identifier to each of the DU 1 to the DU 8.

The OAM may separately send corresponding grouping information to the CU 1 and the CU 2. The foregoing grouping result is used as an example, and the OAM may send grouping information shown in Table 1 to the CU 1, and send grouping information shown in Table 2 to the CU 2.

TABLE 1

| Distributed unit set identifier | Distributed unit |
| --- | --- |
| Identifier of the set 1 | DU 1 |
|  | DU 3 |
| Identifier of the set 2 | DU 2 |
|  | DU 5 |
| Identifier of the set 3 | DU 4 |

TABLE 2

| Distributed unit set identifier | Distributed unit |
| --- | --- |
| Identifier of the set 3 | DU 6 |
| Identifier of the set 4 | DU 7 |
|  | DU 8 |

Alternatively, the OAM may send, to the CU 1 and the CU 2, all grouping information shown in Table 3. The CU 1 and the CU 2 respectively obtain grouping information corresponding to the CU 1 and grouping information corresponding to the CU 2 from the received grouping information. For example, after receiving the grouping information shown in Table 3, the CU 1 may determine that the grouping information of the DU 1 to the DU 5 connected to the CU 1 is: The DU 1 and the DU 3 belong to the set 1, the DU 2 and the DU 5 belong to the set 2, and the DU 4 belongs to the set 3. After receiving the grouping information shown in Table 3, the CU 2 may determine that the grouping information of the DU 6 to the DU 8 connected to the CU 2 is: The DU 6 belongs to the set 3, and the DU 7 and the DU 8 belong to the set 4.

TABLE 3

| Distributed unit set identifier | Distributed unit |
| --- | --- |
| Identifier of the set 1 | DU 1 |
|  | DU 3 |
| Identifier of the set 2 | DU 2 |
|  | DU 5 |
| Identifier of the set 3 | DU 4 |
|  | DU 6 |
| Identifier of the set 4 | DU 7 |
|  | DU 8 |

It should be noted that the grouping information may be sent in a form of a list, or may be sent in another form. In this embodiment of this application, a list is only used as an example for description, and a sending form of the grouping information is not specifically limited.

Based on the methods shown in FIG. 7 to FIG. 10, when a second network device uses the architecture shown in FIG. 3A, a CU in the victim area may determine a grouping status of a connected DU, to exchange information with a radio access network device in an aggressor area. For example, the DU 1 and the DU 3 respectively send an RS 1 of the DU 1 and an RS 3 of the DU 3 to an aggressor device of the set 1. The RS 1 and the RS 3 have a same sequence, the RS 1 and the RS 3 carry same content, or the RS 1 and the RS 3 have a same configuration. In addition, both the RS 1 and the RS 3 carry the identifier of the set 1. After receiving the RS 1 and the RS 3, a first network device determines an address of the CU 1 based on the identifier of the set 1. The first network device determines first auxiliary information, and sends the first auxiliary information to the CU 1. After receiving the first auxiliary information, the CU 1 may send the first auxiliary information to the DUs connected to the CU 1. Similarly, when a second network device uses the architecture shown in FIG. 3B, a CU-CP in the victim area may determine a grouping status of a connected DU, to exchange information with a radio access network device in an aggressor area. For example, the DU 1 and the DU 3 respectively send an RS 1 of the DU 1 and an RS 3 of the DU 3 to an aggressor device of the set 1. The RS 1 and the RS 3 have a same sequence, the RS 1 and the RS 3 carry same content, or the RS 1 and the RS 3 have a same configuration. In addition, both the RS 1 and the RS 3 carry the identifier of the set 1. After receiving the RS 1 and the RS 3, the first network device determines an address of a CU-CP 1 based on the identifier of the set 1. The first network device determines first auxiliary information, and sends the first auxiliary information to the CU-CP 1. After receiving the first auxiliary information, the CU-CP 1 may send the first auxiliary information to the DUs connected to the CU-CP 1. Optionally, the CU 1 or the CU-CP 1 sends second auxiliary information of the DU 1 and second auxiliary information of the DU 3 to the first network device, or generates new second auxiliary information based on second auxiliary information of the DU 1 and second auxiliary information of the DU 3 and sends the new second auxiliary information to the first network device. The new second auxiliary information may be second auxiliary information obtained after a mathematical operation is performed on the second auxiliary information of the DU 1 and the second auxiliary information of the DU 3.

Similarly, the DU 4 and the DU 6 respectively send an RS 4 of the DU 4 and an RS 6 of the DU 6 to an aggressor device of the set 3. The RS 4 and the RS 6 have a same sequence, the RS 4 and the RS 6 carry same content, or the RS 4 and the RS 6 have a same configuration. In addition, both the RS 4 and the RS 6 carry the identifier of the set 3. The identifier of the set 3 may be associated with the identifier or the address of the CU 1, or the identifier of the set 3 may be associated with the identifier or the address of the CU 2. The following uses an example in which the identifier of the set 3 is associated with the identifier of the CU 1. After receiving the RS 4 and the RS 6, the first network device may determine an identifier of the CU 1 or a CU-CP 1 based on the identifier of the set 3. The first network device determines first auxiliary information, and sends the first auxiliary information to the CU 1 or the CU-CP 1, so that the CU 1 or the CU-CP 1 forwards the first auxiliary information to the CU 2 or a CU-CP 2. After receiving the first auxiliary information, the CU 1 or the CU-CP 1 may send the first auxiliary information to the DUs connected to the CU 1 or the CU-CP 1. After receiving the first auxiliary information, the CU 2 or the CU-CP 2 may send the first auxiliary information to the DUs connected to the CU 2 or the CU-CP 2. Optionally, the CU 1 and the CU 2 or the CU-CP 1 and the CU-CP 2 respectively send second auxiliary information of the DU 4 and second auxiliary information of the DU 6 to the first network device. It should be noted that, when the first network device uses the architecture shown in FIG. 3A or FIG. 3B, after receiving the RS 1 and the RS 3, any DU in the aggressor area reports corresponding information to a CU or a CU-CP connected to the DU, and the CU or the CU-CP exchanges information with the second network device.

Based on a same inventive concept as that of the method embodiments, an embodiment of this application provides a remote interference management apparatus. A structure of the remote interference management apparatus may be shown in FIG. 11, and includes a receiving unit 1101, a processing unit 1102, and a sending unit 1103.

In a specific implementation, the remote interference management apparatus may be specifically configured to implement the method performed by the first network device in the embodiment shown in FIG. 4. The apparatus may be the first network device, a chip or a chipset in the first network device, or a part that is in a chip and that is configured to perform a related method function. The receiving unit 1101 is configured to receive an RS sent by a second network device, where the RS is used to indicate that the second network device is subject to remote interference. The processing unit 1102 is configured to determine first auxiliary information, where the first auxiliary information includes at least one of the following information: frequency domain information of a downlink transmission resource of the first network device, time domain information of the downlink transmission resource of the first network device, or beam information of downlink transmission of the first network device. The sending unit 1103 is configured to send, to the second network device, the first auxiliary information determined by the processing unit 1102.

For example, the frequency domain information of the downlink transmission resource of the first network device may include at least one downlink synchronization signal block SSB frequency. Alternatively, the frequency domain information of the downlink transmission resource of the first network device may include at least one downlink SSB frequency and at least one downlink transmission bandwidth configuration.

For example, the time domain information of the downlink transmission resource of the first network device may include at least one slot format slot format configuration.

For example, the beam information of the downlink transmission of the first network device may include at least one downlink beam configuration.

In an implementation, the sending unit 1103 may be specifically configured to send a first message to the second network device, where the first message is used to notify the second network device that the first network device receives the RS, and the first message carries the first auxiliary information.

In another implementation, the sending unit 1103 may be specifically configured to periodically send the first auxiliary information to the second network device.

In another implementation, the sending unit 1103 may be specifically configured to send the first auxiliary information to the second network device when downlink configuration information of the first network device is updated, where the downlink configuration information includes at least one of the following information: a downlink SSB frequency configuration, a downlink transmission bandwidth configuration, a slot format configuration, or a downlink beam configuration.

The receiving unit 1101 may be further configured to receive second auxiliary information sent by the second network device, where the second auxiliary information includes at least one of the following information: frequency domain information corresponding to an uplink transmission resource of the second network device, information about a frequency that is in the uplink transmission resource of the second network device and that is subject to the interference in frequency domain, a quantity of symbols that are in the uplink transmission resource of the second network device and that are subject to the interference in time domain, a slot format configuration of the second network device, or beam information of uplink transmission scheduled by the second network device.

The processing unit 1102 may be further configured to stop performing the downlink transmission on a first transmission resource or reduce power for performing the downlink transmission on a first transmission resource, where the first transmission resource is a transmission resource corresponding to the second auxiliary information.

For example, if the second auxiliary information includes the frequency domain information corresponding to the uplink transmission resource of the second network device or the information about the frequency that is in the uplink transmission resource of the second network device and that is subject to the interference in frequency domain, a frequency domain range of the first transmission resource may be a frequency domain range indicated by the second auxiliary information.

If the second auxiliary information includes the quantity of symbols that are in the uplink transmission resource of the second network device and that are subject to the interference in time domain or the slot format configuration of the second network device, a symbol in the first transmission resource in time domain may be a symbol determined based on the symbol indicated by the second auxiliary information.

If the second auxiliary information includes the beam information of the uplink transmission scheduled by the second network device, a beam corresponding to the first transmission resource may be a beam determined based on the second auxiliary information.

In an example description, the first network device may be a first DU, and the second network device may be a second DU.

In another specific implementation, the remote interference management apparatus may be specifically configured to implement the method performed by the second network device in the embodiment shown in FIG. 6. The apparatus may be the second network device, a chip or a chipset in the second network device, or a part that is in a chip and that is configured to perform a related method function. The receiving unit 1101 is configured to receive a first message sent by a first network device, where the first message is used to notify the second network device that the first network device receives an RS, and the RS is used to indicate that the second network device is subject to remote interference. The processing unit 1102 is configured to determine second auxiliary information, where the second auxiliary information includes at least one of the following information: frequency domain information corresponding to an uplink transmission resource of the second network device, information about a frequency that is in the uplink transmission resource of the second network device and that is subject to the interference in frequency domain, a quantity of symbols that are in the uplink transmission resource of the second network device and that are subject to the interference in time domain, a slot format configuration of the second network device, or beam information of uplink transmission scheduled by the second network device. The sending unit 1103 is configured to send the second auxiliary information to the first network device.

For example, the frequency domain information corresponding to the uplink transmission resource of the second network device may include a synchronization signal block SSB frequency used for the scheduled uplink transmission. Alternatively, the frequency domain information corresponding to the uplink transmission resource of the second network device includes an SSB frequency and a transmission bandwidth configuration that are used for the scheduled uplink transmission.

In an implementation, the sending unit 1103 may be specifically configured to periodically send the second auxiliary information to the first network device.

In another implementation, the sending unit 1103 may be specifically configured to send, by the second network device, the second auxiliary information to the first network device when uplink configuration information of the second network device is updated, where the uplink configuration information includes at least one of the following information: an uplink SSB frequency configuration, an uplink transmission bandwidth configuration, a slot format configuration, or an uplink beam configuration.

During specific implementation, the receiving unit 1101 may be further configured to receive first auxiliary information sent by the first network device, where the first auxiliary information includes at least one of the following information: frequency domain information of a downlink transmission resource of the first network device, time domain information of the downlink transmission resource of the first network device, or beam information of downlink transmission of the first network device.

For example, the frequency domain information of the downlink transmission resource of the first network device may include at least one downlink SSB frequency. Alternatively, the frequency domain information of the downlink transmission resource of the first network device may include at least one downlink SSB frequency and at least one downlink transmission bandwidth configuration.

For example, the time domain information corresponding to the downlink transmission resource of the first network device may include at least one slot format slot format configuration.

For example, the downlink beam information of the first network device may include one or more downlink beam configurations.

The processing unit 1102 may be further configured to schedule the uplink transmission on a first transmission resource, where the first transmission resource is a transmission resource other than a second transmission resource, and the second transmission resource is a transmission resource corresponding to the first auxiliary information.

For example, if the first auxiliary information includes the frequency domain information of the downlink transmission resource of the first network device, a frequency of the first transmission resource may be any frequency outside a frequency domain range indicated by the first auxiliary information.

If the first auxiliary information includes the time domain information of the downlink transmission resource of the first network device, a symbol in the first transmission resource in time domain may be a symbol determined based on a symbol indicated by the first auxiliary information.

If the first auxiliary information includes the beam information corresponding to the downlink transmission resource of the first network device, a beam corresponding to the first transmission resource may be a beam determined based on the first auxiliary information.

In an example description, the first network device is a first DU, and the second network device is a second DU.

Division into the modules in the embodiments of this application is an example, is merely logical function division, and may be other division in an actual implementation. In addition, function modules in the embodiments of this application may be integrated into one processor, or each of the modules may exist alone physically, or two or more modules may be integrated into one module. The integrated module may be implemented in a form of hardware, or may be implemented in a form of a software function module. It may be understood that, for functions or implementations of the modules in the embodiments of this application, further refer to related descriptions in the method embodiments.

Figure 12:
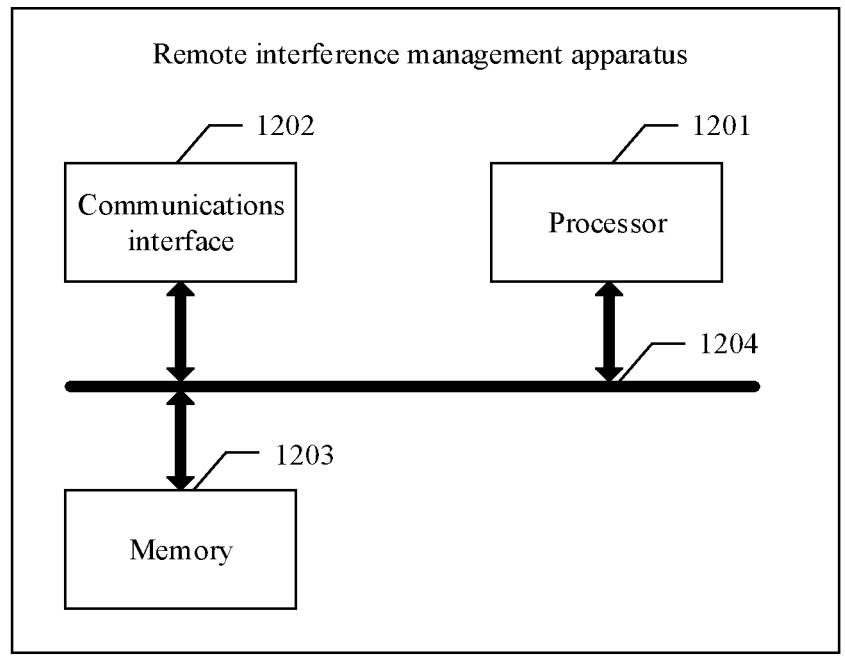
FIG. 12 is a schematic structural diagram of another remote interference management apparatus according to an embodiment of this application.

In a possible manner, a remote interference management apparatus may be shown in FIG. 12, and the apparatus may be a network device or a chip in a network device. The apparatus may include a processor 1201, a communications interface 1202, and a memory 1203. The processing unit 1102 may be the processor 1201. The receiving unit 1101 and the sending unit 1103 may be the communications interface 1202.

The processor 1201 may be a central processing unit (CPU), a digital processing unit, or the like. The communications interface 1202 may be a transceiver, an interface circuit such as a transceiver circuit, a transceiver chip, or the like. The apparatus further includes the memory 1203, configured to store a program executed by the processor 1201. The memory 1203 may be a nonvolatile memory, for example, a hard disk drive (HDD) or a solid-state drive (SSD), or may be a volatile memory, for example, a random-access memory (RAM). The memory 1203 is any other medium that can be configured to carry or store expected program code that is in a form of an instruction or a data structure and that can be accessed by a computer, but is not limited thereto.

The processor 1201 is configured to execute program code stored in the memory 1203, and is specifically configured to perform an action of the processing unit 1102. Details are not described herein again in this application.

The communications interface 1202 is specifically configured to perform actions of the receiving unit 1101 and the sending unit 1103. Details are not described herein again in this application.

A specific connection medium between the communications interface 1202, the processor 1201, and the memory 1203 is not limited in the embodiments of this application. In the embodiments of this application, in FIG. 12, the memory 1203, the processor 1202, and the communications interface 1201 are connected through a bus 1204. The bus is represented by a thick line in FIG. 12. A connection manner between other components is merely an example for description, and is not limited thereto. The bus may be classified as an address bus, a data bus, a control bus, or the like. For ease of representation, only one thick line is used to represent the bus in FIG. 12, but it does not mean that there is only one bus or only one type of bus.

A plurality of DUs in an aggressor area may also be grouped by OAM. For example, the OAM groups the plurality of DUs in the aggressor area into different distributed unit sets according to a preset rule or based on strength of RS signals received by the DUs in the aggressor area. A distributed unit set is indicated by a distributed unit set identifier, and the distributed unit set identifier is associated with an identifier or an address of one or more CUs connected to DUs in the distributed unit set in the aggressor area. The distributed unit set identifier is also referred to as an aggressor distributed unit set identifier. Similar to the method described in the embodiment in FIG. 7 or FIG. 8, any CU in the aggressor area may obtain an aggressor distributed unit set identifier of each DU connected to the CU.

Figure 13:
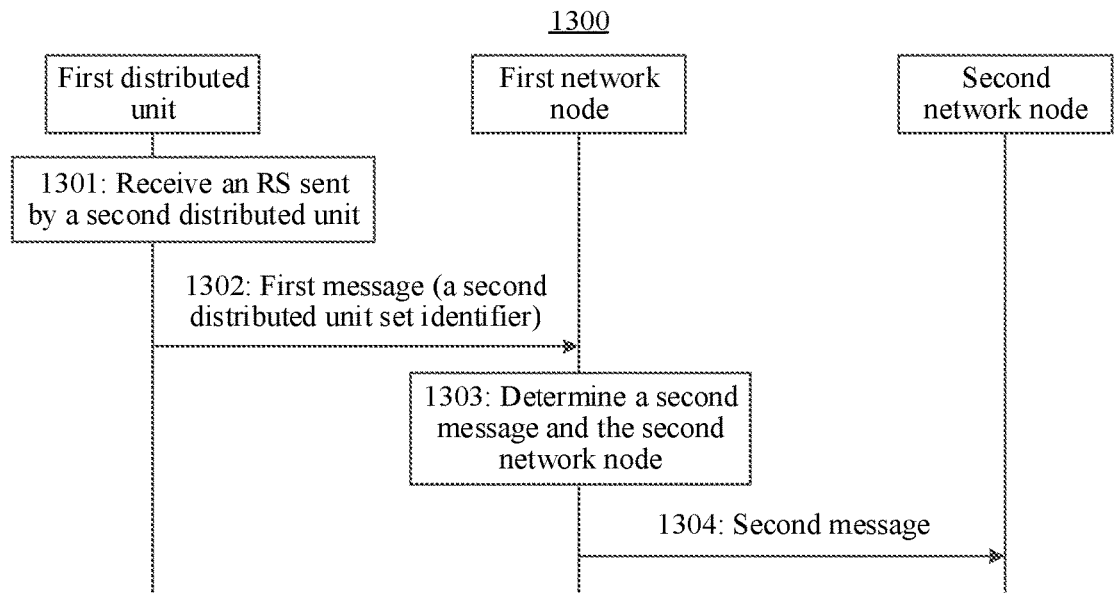
FIG. 13 is a flowchart of still another remote interference management method according to an embodiment of this application.

FIG. 13 is a flowchart of another remote interference management method according to this application. A first DU is any first network device in an aggressor area. A second DU is any second network device in a victim area. The first DU is connected to a first CU or a first CU-CP. The second DU is connected to a second CU or a second CU-CP. The method 1300 is applied to information exchange between the first network device and the second network device. The method includes the following operations.

S1301: The first DU receives an RS sent by the second DU.

The RS includes a distributed unit set identifier of the second DU, which is also referred to as a second distributed unit set identifier.

A distributed unit set identifier of a distributed unit set may be associated with an identifier or an address of a CU connected to a DU in the distributed unit set. For example, in the embodiments in FIG. 7 to FIG. 10, the identifier of the distributed unit set 1 may be associated with the identifier or the address of the CU 1. The identifier of the distributed unit set set 3 may be associated with the identifier or the address of the CU 1 and the identifier or the address of the CU 2.

S1302: The first DU sends a first message to a first network node, where the first message includes the second distributed unit set identifier.

The first message may be a notification message that the first DU receives the RS sent by the second DU, a notification message that the first DU detects that the RS disappears, or the first auxiliary information in the foregoing embodiments.

Optionally, the first message includes an aggressor distributed unit set identifier of the first DU, which is also referred to as a first distributed unit set identifier.

The first network node is the first CU or the first CU-CP connected to the first DU.

S1303: The first network node determines, based on the second distributed unit set identifier, a second network node connected to the second DU, and determines a second message.

The second network node is the second CU or the second CU-CP connected to the second DU. Specifically, the first network node determines, based on a relationship between a distributed unit set identifier and an identifier or an address of a CU or a CU-CP connected to a distributed unit, the second network node corresponding to the second distributed unit set identifier.

The first network node determines the second message based on the first message. The second message may be the same as or different from the first message.

S1304: The first network node determines the second message, and sends the second message to the second network node.

Optionally, the second message includes the second distributed unit set identifier.

Optionally, the second message includes the first distributed unit set identifier.

In this embodiment of this application, the DU in the aggressor area includes the second distributed unit set identifier in the first message, so that signaling overheads between the DU and the CU or the CU-CP connected to the DU are reduced. The CU or the CU-CP connected to the DU in the aggressor area determines, based on the second distributed unit set identifier, an identifier or an address of the CU or the CU-CP connected to the DU in the victim area, so that data can be accurately transmitted to the network device in the victim area.

Figure 14:
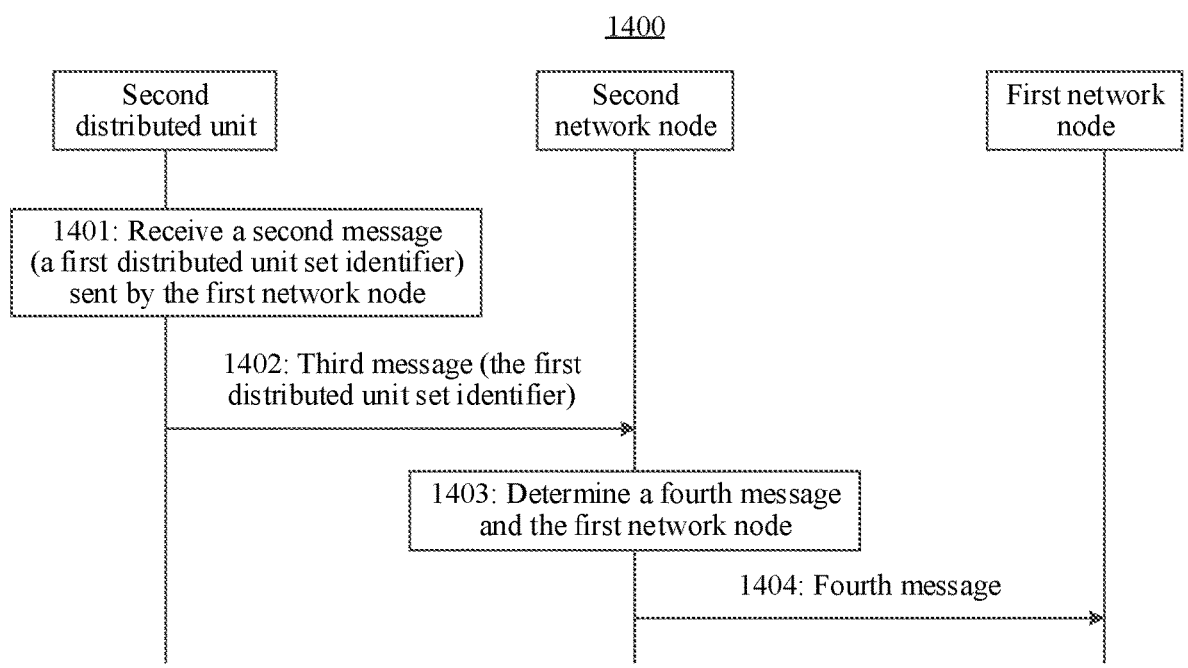
FIG. 14 is a flowchart of yet another remote interference management method according to an embodiment of this application.

FIG. 14 is a flowchart of another remote interference management method according to this application. A first DU is any first network device in an aggressor area. A second DU is any second network device in a victim area. The first DU is connected to a first CU or a first CU-CP. The second DU is connected to a second CU or a second CU-CP. The method 1400 is applied to information exchange between the first network device and the second network device. The method includes the following operations.

S1401: The second DU receives, through a second network node, a second message sent by a first network node.

The second message includes a first distributed unit set identifier.

The first network node is the first CU or the first CU-CP connected to the first DU. The first DU is the first network device that causes remote interference to the second DU. In other words, the first DU receives a reference signal RS sent by the second DU. A distributed unit set identifier of the first DU is the first distributed unit set identifier.

A distributed unit set identifier of a distributed unit set may be associated with an identifier or an address of a CU connected to a DU in the distributed unit set. For example, in the embodiments in FIG. 7 to FIG. 10, the identifier of the distributed unit set set 1 may be associated with the identifier or the address of the CU 1. The identifier of the distributed unit set set 3 may be associated with the identifier or the address of the CU 1 and the identifier or the address of the CU 2.

The second message may be a notification message that the first DU receives the RS sent by the second DU, a notification message that the first DU detects that the RS disappears, or the first auxiliary information in the foregoing embodiments.

The second network node is the second CU or the second CU-CP connected to the second DU.

S1402: The second DU sends a third message to the second network node, where the third message includes the first distributed unit set identifier.

The third message may be the second auxiliary information in the foregoing embodiments.

S1403: The second network node determines, based on the first distributed unit set identifier, the first network node connected to the first DU, and determines a fourth message.

The second network node is the second CU or the second CU-CP connected to the second DU. Specifically, the second network node determines, based on a relationship between a distributed unit set identifier and an identifier or an address of a CU or a CU-CP connected to a distributed unit, the first network node corresponding to the first distributed unit set identifier.

The second network node determines the fourth message based on the third message. The fourth message may be the same as or different from the third message.

S1404: The second network node sends the fourth message to the first network node.

Optionally, the fourth message includes the first distributed unit set identifier.

In this embodiment of this application, the DU in the victim area includes the first distributed unit set identifier in the third message, so that signaling overheads between the DU and the CU or the CU-CP connected to the DU are reduced. The CU or the CU-CP connected to the DU in the victim area determines, based on the first distributed unit set identifier, an identifier or an address of the CU or the CU-CP connected to the DU in the aggressor area, so that data can be accurately transmitted to the network device in the aggressor area.

The embodiments of FIG. 13 and FIG. 14 are further described below by using an example. When the second network device uses the architecture shown in FIG. 3A, the CU in the victim area may determine a grouping status of the connected DU, to exchange information with a radio access network device in the aggressor area. For example, the DU 1 and the DU 3 respectively send an RS 1 of the DU 1 and an RS 3 of the DU 3 to an aggressor device of the set 1. The RS 1 and the RS 3 have a same sequence, the RS 1 and the RS 3 carry same content, or the RS 1 and the RS 3 have a same configuration. In addition, both the RS 1 and the RS 3 carry the identifier of the set 1. After receiving the RS 1 and the RS 3, the first network device determines the identifier or the address of the CU 1 based on the identifier of the set 1. The first network device determines the first auxiliary information, and sends the first auxiliary information to the CU 1. After receiving the first auxiliary information, the CU 1 may send the first auxiliary information to the DUs connected to the CU 1. Similarly, when the second network device uses the architecture shown in FIG. 3B, the CU-CP in the victim area may determine a grouping status of the connected DU, to exchange information with the radio access network device in the aggressor area. For example, the DU 1 and the DU 3 respectively send an RS 1 of the DU 1 and an RS 3 of the DU 3 to an aggressor device of the set 1. The RS 1 and the RS 3 have a same sequence, the RS 1 and the RS 3 carry same content, or the RS 1 and the RS 3 have a same configuration. In addition, both the RS 1 and the RS 3 carry the identifier of the set 1. After receiving the RS 1 and the RS 3, the first network device determines the identifier or the address of the CU-CP 1 based on the identifier of the set 1. The first network device determines the first auxiliary information, and sends the first auxiliary information to the CU-CP 1. After receiving the first auxiliary information, the CU-CP 1 may send the first auxiliary information to the DUs connected to the CU-CP 1. Optionally, the first network device sends the first message to the CU 1 or the CU-CP 1, and includes the identifier of the set 1 in the first message. The CU 1 or the CU-CP 1 may send, to the DUs corresponding to the set 1, based on the identifier of the set 1, the received first message sent by the first network device. For example, the first network device receives the RS 1 and the RS 3 that are respectively sent by the DU 1 and the DU 3, or detects that the RS 1 and the RS 3 disappear, and the first network device sends, to the CU 1 or the CU-CP 1, a notification message that the RSs are received or a notification message that the RSs disappear. Both the two notification messages may be used as the first message. The first message may be further used to carry the first auxiliary information. The first message may be further used to carry other information. This is not limited in this application. Optionally, the CU 1 or the CU-CP 1 sends second auxiliary information of the DU 1 and second auxiliary information of the DU 3 to the first network device, or generates new second auxiliary information based on second auxiliary information of the DU 1 and second auxiliary information of the DU 3 and sends the new second auxiliary information to the first network device. The new second auxiliary information may be second auxiliary information obtained after a mathematical operation is performed on the second auxiliary information of the DU 1 and the second auxiliary information of the DU 3.

Similarly, the DU 4 and the DU 6 respectively send an RS 4 of the DU 4 and an RS 6 of the DU 6 to an aggressor device of the set 3. The RS 4 and the RS 6 have a same sequence, the RS 4 and the RS 6 carry same content, or the RS 4 and the RS 6 have a same configuration. In addition, both the RS 4 and the RS 6 carry the identifier of the set 3. The identifier of the set 3 may be associated with the identifier or the address of the CU 1 and the identifier or the address of the CU 2. The following uses an example in which the identifier of the set 3 is associated with the identifier of the CU 1. After receiving the RS 4 and the RS 6, the first network device may determine the identifier or the address of the CU 1 or the CU-CP 1 based on the identifier of the set 3. The first network device determines the first auxiliary information, and sends the first auxiliary information to the CU 1 or the CU-CP 1, so that the CU 1 or the CU-CP 1 forwards the first auxiliary information to the CU 2 or a CU-CP 2. After receiving the first auxiliary information, the CU 1 or the CU-CP 1 may send the first auxiliary information to the DUs connected to the CU 1 or the CU-CP 1. After receiving the first auxiliary information, the CU 2 or the CU-CP 2 may send the first auxiliary information to the DUs connected to the CU 2 or the CU-CP 2. Optionally, the CU 1 and the CU 2 or the CU-CP 1 and the CU-CP 2 respectively send second auxiliary information of the DU 4 and second auxiliary information of the DU 6 to the first network device.

The following uses an example in which the identifier of the set 3 is associated with the identifier of the CU 1 and the identifier of the CU 2. After receiving the RS 4 and the RS 6, the first network device may determine the identifier or the address of the CU 1 (or the CU-CP 1) and the identifier or the address of the CU 2 (or the CU-CP 2) based on the identifier of the set 3. The first network device determines the first auxiliary information, and sends the first auxiliary information to the CU 1 (or the CU-CP 1) and the CU 2 (or the CU-CP 2). Optionally, the first network device sends the first message to the CU 1 (or the CU-CP 1) and the CU 2 (or the CU-CP 2), and includes the identifier of the set 3 in the first message, so that the CU 1 (or the CU-CP 1) and the CU 2 (or the CU-CP 2) may send, to the DU 4 and the DU 6 corresponding to the set 3, based on the identifier of the set 3, the received first message sent by the first network device. For example, the first network device receives the RS 4 and the RS 6 that are respectively sent by the DU 4 and the DU 6 or detects that the RS 4 and the RS 6 disappear, and the first network device sends, to the CU 1 (or the CU-CP 1) and the CU 2 (or the CU-CP 2), a notification message that the RSs are received or a notification message that the RSs disappear. Both the two notification messages may be used as the first message. The first message may be further used to carry the first auxiliary information. The first message may be further used to carry other information. This is not limited in this application. Optionally, the CU 1 (or the CU-CP 1) sends second auxiliary information of the DU 4 to the first network device, and the CU 2 (or the CU-CP 2) sends second auxiliary information of the DU 6 to the first network device.

It should be noted that, when the first network device uses the architecture shown in FIG. 3A or FIG. 3B, after receiving the RS 1 and the RS 3, or the RS 4 and the RS 6, any DU in the aggressor area reports corresponding information to a CU or a CU-CP connected to the DU, and the CU or the CU-CP exchanges information with the second network device.

Optionally, when receiving the RS sent by the second network device, the DU sends the second message to the CU or the CU-CP connected to the DU, where the second message includes the corresponding information. When the DU receives the RS 1 and the RS 3, the corresponding information is the identifier of the set 1, and the CU or the CU-CP connected to the DU determines the identifier or the address of the CU 1 (or the CU-CP 1) based on the received identifier of the set 1. When the DU receives the RS 4 and the RS 6, the corresponding information is the identifier of the set 3, and the CU or the CU-CP connected to the DU determines the identifier or the address of the CU 1 (or the CU-CP 1) and the identifier or the address of the CU 2 (or the CU-CP 2) based on the received identifier of the set 3. The CU or the CU-CP connected to the DU sends the first auxiliary information to the CU or the CU-CP connected to the second network device in the victim area. For example, when the DU receives the RS sent by the second network device or detects that the corresponding RS disappears, the DU sends, to the CU or the CU-CP connected to the DU, a notification message that the RS is received or a notification message that the RS disappears. Both the two notification messages may be used as the second message. The second message may be further used to carry the first auxiliary information. The second message may be further used to carry other information. This is not limited in this application. It can be learned that, because there are usually a plurality of second network devices, different from a technical solution in which the DU in the aggressor area determines, based on the received distributed unit set identifier sent by the second network device, the identifier or the address of the CU or the CU-CP connected to the second network device, and includes, in the second message, the identifier or the address of the CU or the CU-CP connected to the second network device, in this embodiment of this application, the DU in the aggressor area includes the distributed unit set identifier in the second message. This reduces signaling overheads between the DU and the CU or the CU-CP connected to the DU. Optionally, the CU or the CU-CP connected to the DU sends the first message to the CU or the CU-CP connected to the second network device in the victim area, and includes the corresponding distributed unit set identifier in the first message. For example, a first message sent by a CU or a CU-CP connected to any DU in the aggressor area to the CU 1 (or the CU-CP 1) carries the identifier of the set 1. Alternatively, the first message sent by a CU or a CU-CP connected to any DU in the aggressor area to the CU 1 (or the CU-CP 1) and the CU 2 (or the CU-CP 2) carries the identifier of the set 3. The first message may be a notification message that the DU receives the RS sent by the first network device or a notification message that the DU detects that the RS disappears. The first message may be further used to carry the first auxiliary information. The first message may be further used to carry other information. This is not limited in this application.

Optionally, a CU or a CU-CP connected to any DU in the aggressor area sends the first message to the CU or the CU-CP connected to the second network device in the victim area, and includes an aggressor distributed unit set identifier of the DU in the first message. Correspondingly, the CU or the CU-CP connected to the second network device in the victim area sends a fifth message to the second network device, and includes the aggressor distributed unit set identifier in the fifth message. Optionally, after receiving the first information of the CU or the CU-CP connected to the first network device, the CU or the CU-CP connected to the second network device in the victim area sends a fifth message to the second network device including the aggressor distributed unit set identifier. The first message carries the aggressor distributed unit set identifier. Optionally, the CU or the CU-CP connected to the first network device sends, to the CU or the CU-CP connected to the second network device, the notification message that the first network device receives the RS or the notification message that the first network device detects that the RS disappears. Both the notification messages may be used as the first message. The first message may be further used to carry the first auxiliary information. The first message may be further used to carry other information. This is not limited in this application. Optionally, the CU or the CU-CP connected to the second network device sends, to the second network device, the notification message that the first network device receives the RS or the notification message that the first network device detects that the RS disappears. Both the notification messages may be used as the fifth message. The fifth message may be further used to carry the first auxiliary information. The fifth message may be further used to carry other information. This is not limited in this application. It can be learned that because there may be a plurality of aggressor areas, the second network device may identify the aggressor area based on the received aggressor distributed unit set identifier. Optionally, the second network device sends a third message to the CU or the CU-CP connected to the second network device, and includes the aggressor distributed unit set identifier in the third message. The CU or the CU-CP determines, based on the aggressor distributed unit set identifier, the identifier or the address of the CU or the CU-CP connected to the first network device, and sends the third message to the CU or the CU-CP connected to the first network device. For example, the third message may be used to carry the second auxiliary information, or may be used to carry other information. This is not limited in this application. It can be learned that, because there are usually a plurality of first network devices, different a technical solution in which the DU in the victim area determines, based on the received aggressor distributed unit set identifier sent by the first network device, the identifier or the address of the CU or the CU-CP connected to the first network device, and includes, in the third message, the identifier or the address of the CU or the CU-CP connected to the first network device, in this embodiment of this application, the DU in the victim area includes the aggressor distributed unit set identifier in the third message. This reduces signaling overheads between the DU and the CU or the CU-CP connected to the DU. Optionally, the CU or CU-CP connected to the second network device in the victim area sends a fourth message to the CU or CU-CP connected to the first network device, and includes the aggressor distributed unit set identifier in the fourth message. Therefore, the CU or the CU-CP connected to the first network device sends the fourth message to the corresponding first network device based on the aggressor distributed unit set identifier. For example, the fourth message may be used to carry the second auxiliary information, or may be used to carry other information. This is not limited in this application.

Figure 11:
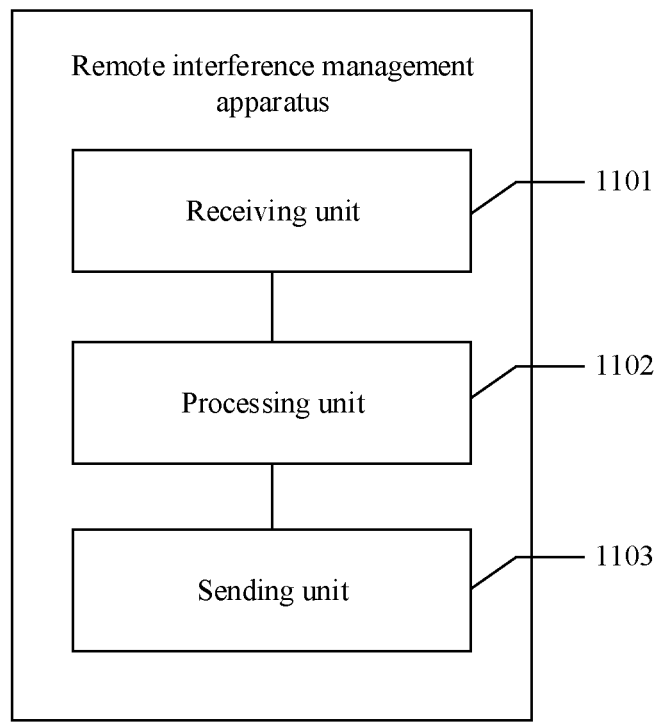
FIG. 11 is a schematic structural diagram of a remote interference management apparatus according to an embodiment of this application.

FIG. 11 is a schematic block diagram of a network device according to an embodiment of this application. The network device may correspond to (for example, may be disposed in or may be) the first distributed unit, the first network node, or the second network node described in the method 1300, or the second distributed unit, the first network node, or the second network node described in the method 1400. The network device may include a receiving unit 1101, a processing unit 1102, and a sending unit 1103. The processing module 1102 is communicatively coupled to the receiving module 1101 and the sending module 1103. The network device may further include a storage unit, configured to store a program or data to be executed by the processing module 1102, or store information received through the receiving module 1101 and/or sent through the sending module 1103. The modules or units in the network device are configured to perform actions or processing processes performed by the first distributed unit, the first network node, or the second network node described in the method 1300, or the second distributed unit, the first network node, or the second network node described in the method 1400. To avoid repetition, detailed descriptions thereof are omitted herein.

FIG. 12 is another schematic block diagram of a network device according to an embodiment of this application. The network device may correspond to (for example, may be disposed in or may be) the first distributed unit, the first network node, or the second network node described in the method 1300, or the second distributed unit, the first network node, or the second network node described in the method 1400. The network device may include a processor 1201 and a transceiver 1202. The processor 1201 is communicatively coupled to the transceiver 1202. The network device may further include a memory 1203. The memory 1203 is communicatively coupled to the processor 1201. Optionally, the processor 1201, the memory 1203, and the transceiver 1202 may be communicatively coupled. The memory 1203 may be configured to store instructions, and may be further configured to store information received and/or sent by the transceiver 1202. The processor 1201 is configured to execute the instructions stored in the memory 1203, to control the transceiver 1202 to receive and/or send information or a signal. The processor 1201, the transceiver 1202, and the memory 1203 are configured to perform actions or processing processes performed by the first distributed unit, the first network node, or the second network node described in the method 1300, or the second distributed unit, the first network node, or the second network node described in the method 1400. To avoid repetition, detailed descriptions thereof are omitted herein.

An embodiment of this application further provides a computer-readable storage medium, configured to store computer software instructions to be executed for execution of the foregoing processor, and the computer-readable storage medium includes a program to be executed for execution of the foregoing processor.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state-drive (SSD)), or the like.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided to a processor of a general-purpose computer, a dedicated computer, an embedded processor, or another programmable data processing device to generate a machine, so that instructions that are executed by a processor of a computer or another programmable data processing device generate an apparatus configured to implement specific functions in one or more processes in the flowcharts and/or in one or more blocks in the block diagrams.

These computer program instructions may be stored in a computer-readable memory that can instruct a computer or a data processing device to work in a specific manner, so that the instructions stored in the computer-readable memory generate an artifact that includes an instruction apparatus. The instruction apparatus implements specific functions in one or more processes in the flowcharts and/or in one or more blocks in the block diagrams.

These computer program instructions may be loaded onto a computer or other programmable data processing devices, so that a series of operations and operations are performed on the computer or the another programmable device, thereby generating computer-implemented processing. Therefore, the instructions executed on the computer or the other programmable devices provide operations for implementing specific functions in one or more processes in the flowcharts and/or in one or more blocks in the block diagrams.

It is clear that, a person skilled in the art can make various modifications and variations to this application without departing from the spirit and scope of this application. In this way, this application is intended to cover these modifications and variations of this application provided that they fall within the scope of the claims of this application and their equivalent technologies. For example, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A remote interference management method, wherein the method comprises:
   receiving, by a first distributed unit (DU), a reference signal (RS) sent by a second DU, wherein the RS indicates that the second DU is subject to remote interference, the RS comprises a second distributed unit set identifier of the second DU, and the second distributed unit set identifier identifies a distributed unit set to which the second DU belongs; and
   sending, by the first DU, a first message to a first centralized unit (CU) or a first centralized unit-control plane (CU-CP), wherein the first message comprises the second distributed unit set identifier, and wherein the first DU and the first CU are radio access network devices, and the first CU includes the first CU-CP.

2. The method according to claim 1, wherein the first message further comprises at least one of the following: a notification message that the first DU receives the RS sent by the second DU, a notification message that the first DU detects that the RS disappears, or a first auxiliary information.

3. The method according to claim 2, wherein the first auxiliary information comprises at least one of the following information: frequency domain information of a downlink transmission resource of the first DU, time domain information of the downlink transmission resource of the first DU, or beam information of downlink transmission of the first DU.

4. A remote interference management method, wherein the method comprises:
   receiving, by a first network node, a first message sent by a first distributed unit (DU), wherein the first message comprises a second distributed unit set identifier, the second distributed unit set identifier is carried in a reference signal (RS) that is sent by a second DU and received by the first DU, and the second distributed unit set identifier identifies a distributed unit set to which the second DU belongs;
   identifying, by the first network node based on the second distributed unit set identifier, a second centralized unit (CU) or a second centralized unit-control plane (CU-CP) coupled to the second DU;
   obtaining, by the first network node, a second message based at least in part on the first message; and
   sending, by the first network node, the second message to the second CU or the second CU-CP, wherein the first DU and the first network node are radio access network devices.

5. The method according to claim 4, wherein the second message comprises the second distributed unit set identifier.

6. The method according to claim 4, wherein at least one of the first message or the second message further comprises a first distributed unit set identifier, and the first distributed unit set identifier identifies a distributed unit set to which the first DU belongs.

7. The method according to claim 4, wherein at least one of the first message or the second message further comprises at least one of the following: a notification message that the first DU receives the RS sent by the second DU, a notification message that the first DU detects that the RS disappears, or first auxiliary information.

8. The method according to claim 7, wherein the first auxiliary information comprises at least one of the following information: frequency domain information of a downlink transmission resource of the first DU, time domain information of the downlink transmission resource of the first DU, or beam information of downlink transmission of the first DU.

9. The method according to claim 4, wherein the determining, by the first network node based on the second distributed unit set identifier, a second CU or a second CU-CP connected to the second DU comprises:
   determining, by the first network node based on the second distributed unit set identifier, an identifier or an address of the second CU or the second CU-CP connected to the second DU.

10. The method according to claim 4, wherein the first network node is a first CU or a first CU-CP connected to the first DU.

11. A first distributed unit (DU), comprising:
    at least one processor configured with processor-executable instructions to perform operations comprising:
    receiving a reference signal (RS) sent by a second distributed unit, wherein the RS indicates that the second DU is subject to remote interference, the RS comprises a second DU set identifier of the second DU, and the second DU set identifier identifies a DU set to which the second DU belongs; and
    sending a first message to a first centralized unit (CU) or a first centralized unit-control plane (CU-CP) connected to the communications apparatus, wherein the first message comprises the second DU set identifier, and wherein the first DU and the first CU are radio access network devices, and the first CU includes the first CU-CP.

12. The first DU according to claim 11, wherein the first message further comprises at least one of the following: a notification message that the communications apparatus receives the RS sent by the second DU, a notification message that the communications apparatus detects that the RS disappears, or first auxiliary information.

13. The first DU according to claim 12, wherein the first auxiliary information comprises at least one of the following information: frequency domain information of a downlink transmission resource of the communications apparatus, time domain information of the downlink transmission resource of the communications apparatus, or beam information of downlink transmission of the communications apparatus.

14. A first network node, comprising:
   at least one processor configured with processor-executable instructions to perform operations comprising:
   receiving a first message sent by a first distributed unit (DU), wherein the first message comprises a second DU set identifier, the second DU set identifier is carried in a reference signal (RS) that is sent by a second DU and that is received by the first DU, and the second distributed unit set identifier identifies a DU set to which the second DU belongs;
   determining, based on the second distributed unit set identifier, a second centralized unit (CU) or a second centralized unit-control plane (CU-CP) coupled to the second DU;
   obtaining a second message based at least in part on the first message; and
   sending the second message to the second CU or the second CU-CP, wherein the first DU and the first network node are radio access network devices.

15. The first network node according to claim 14, wherein the second message comprises the second DU set identifier.

16. The first network node according to claim 14, wherein at least one of the first message or the second message further comprises a first DU set identifier, and the first DU set identifier identifies a DU set to which the first DU belongs.

17. The first network node according to claim 14, wherein at least one of the first message or the second message further comprises at least one of the following: a notification message that the first DU receives the RS sent by the second DU, a notification message that the first DU detects that the RS disappears, or first auxiliary information.

18. The first network node according to claim 17, wherein the first auxiliary information comprises at least one of the following information: frequency domain information of a downlink transmission resource of the first DU, time domain information of the downlink transmission resource of the first DU, or beam information of downlink transmission of the first DU.

19. The first network node according to claim 14, wherein the programming instructions further cause the communications apparatus to:
   determine, based on the second DU set identifier, an identifier of the second CU or the second CU-CP connected to the second DU.

20. The first network node according to claim 14, wherein the first network node is a first CU or a first CU-CP connected to the first DU.

* * * * *